(12) United States Patent
Girardin

(10) Patent No.: US 11,970,123 B2
(45) Date of Patent: Apr. 30, 2024

(54) ADVERSE DRIVING EVENT DATA RECORDER FOR A WHEELCHAIR SECUREMENT SYSTEM

(71) Applicant: Valeda Company, LLC, Oakland Park, FL (US)

(72) Inventor: Patrick Girardin, Ft. Lauderdale, FL (US)

(73) Assignee: Valeda Company, LLC, Oakland Park, FL (US)

(*) Notice: Subject to any disclaimer, the term of this patent is extended or adjusted under 35 U.S.C. 154(b) by 0 days.

(21) Appl. No.: 18/298,156

(22) Filed: Apr. 10, 2023

(65) Prior Publication Data
US 2023/0242059 A1 Aug. 3, 2023

Related U.S. Application Data

(63) Continuation of application No. 17/611,692, filed as application No. PCT/US2020/034186 on May 22, 2020.
(Continued)

(51) Int. Cl.
*B60R 21/01* (2006.01)
*A61G 3/08* (2006.01)
(Continued)

(52) U.S. Cl.
CPC ........ *B60R 21/0132* (2013.01); *A61G 3/0808* (2013.01); *B60R 21/055* (2013.01);
(Continued)

(58) Field of Classification Search
CPC ... B60R 21/0132; B60R 21/055; B60R 21/16; B60R 2021/0004; B60R 2021/0006;
(Continued)

(56) References Cited

U.S. PATENT DOCUMENTS

| 2008/0247837 A1 | 10/2008 | Cardona |
| 2011/0123286 A1 | 5/2011 | Roosmalen et al. |

(Continued)

FOREIGN PATENT DOCUMENTS

| DE | 102009012407 | 2/2011 |
| DE | 102017218024 A1 | 4/2019 |

(Continued)

OTHER PUBLICATIONS

International Search Report and Written Opinion for PCT/US2020/034186, dated Aug. 28, 2020, 11 pages, International Searching Authority for the European Patent Office.

*Primary Examiner* — Michael V Kerrigan
(74) *Attorney, Agent, or Firm* — Daniel Tallitsch

(57) ABSTRACT

A computing device is provided to monitor or ascertain various characteristics of one or more of a wheeled mobility device securement system, a wheeled mobility device, and an occupant of the wheeled mobility device. The computing device can send any and all data available to it, including but not limited to time, dynamic information concerning the vehicle, the wheeled mobility device securement system, the wheeled mobility device, and the occupant, the actions taken by the computing device during an adverse driving condition, and when those actions were taken, to memory for use after the adverse driving event for analysis purposes to understand and recreate the event.

21 Claims, 17 Drawing Sheets

Related U.S. Application Data

(60) Provisional application No. 62/851,466, filed on May 22, 2019.

(51) Int. Cl.
  *B60R 21/0132* (2006.01)
  *B60R 21/055* (2006.01)
  *B60R 21/16* (2006.01)
  *B60R 21/00* (2006.01)

(52) U.S. Cl.
  CPC ...... *B60R 21/16* (2013.01); *B60R 2021/0004* (2013.01); *B60R 2021/0006* (2013.01); *B60R 2021/0018* (2013.01); *B60R 2021/0048* (2013.01); *B60R 2021/006* (2013.01); *B60R 2021/01231* (2013.01)

(58) Field of Classification Search
  CPC .... B60R 2021/0018; B60R 2021/0048; B60R 2021/006; B60R 2021/01231; B60R 21/01544; B60R 2021/0009; B60R 2021/0011; B60R 2021/0023; A61G 3/0808; A61G 3/006; A61G 2203/70; A61G 2203/723; B60Y 2200/84
  See application file for complete search history.

(56) References Cited

U.S. PATENT DOCUMENTS

2013/0328340 A1  12/2013  Bruns
2020/0238855 A1  7/2020  Seib et al.

FOREIGN PATENT DOCUMENTS

| | | |
|---|---|---|
| EP | 2016925 A1 | 1/2009 |
| GB | 2436692 A | 10/2007 |
| JP | 2018090143 A | 6/2018 |
| WO | 2014185962 A2 | 11/2014 |

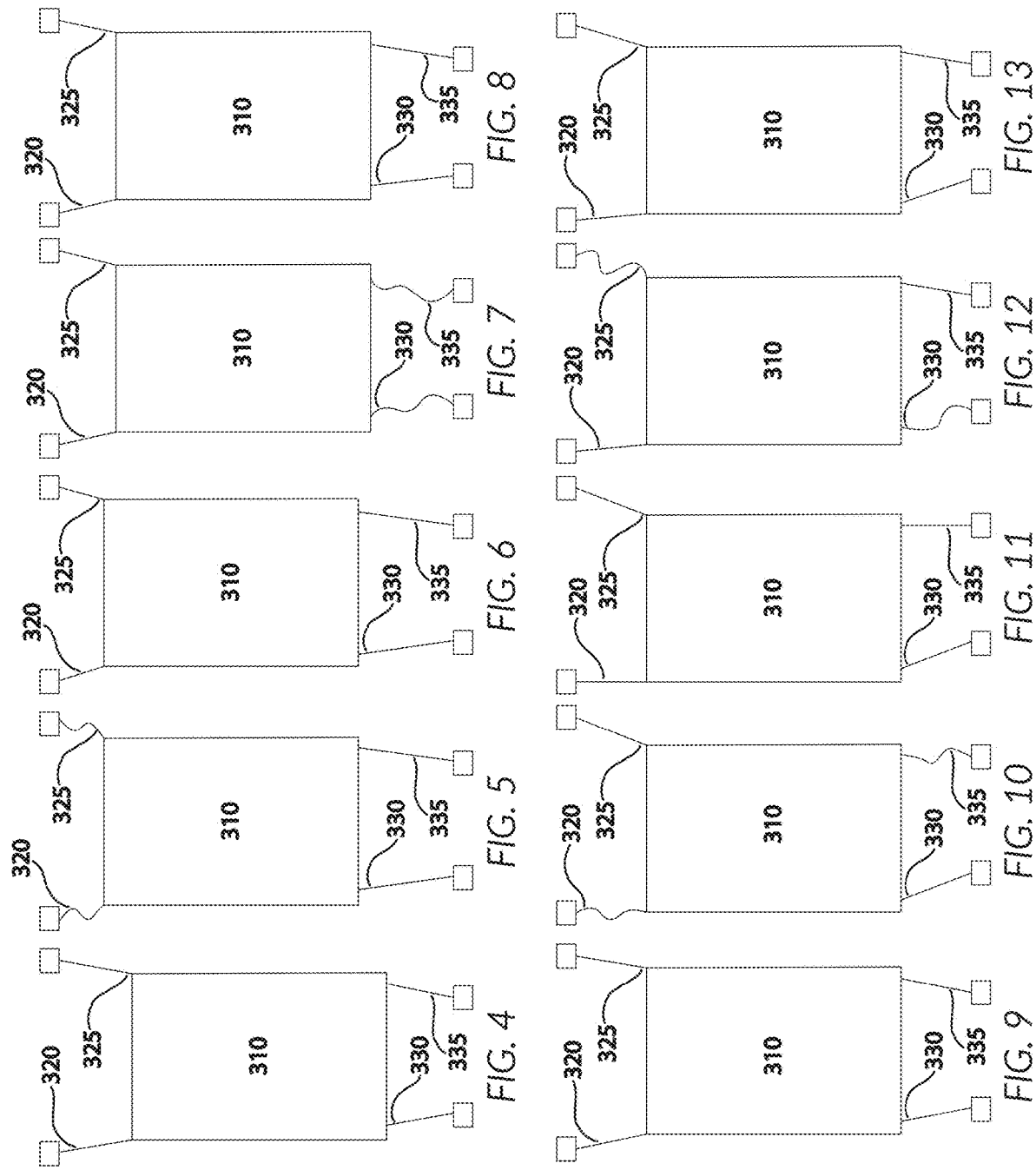

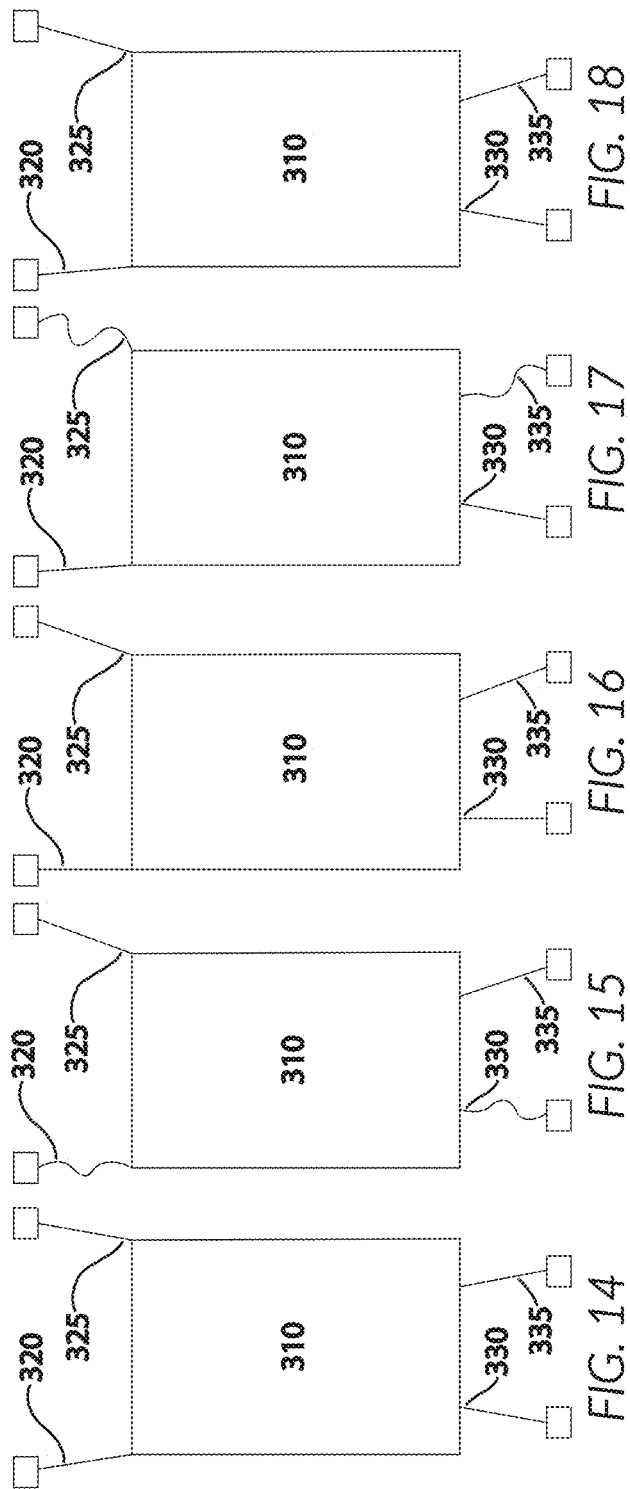

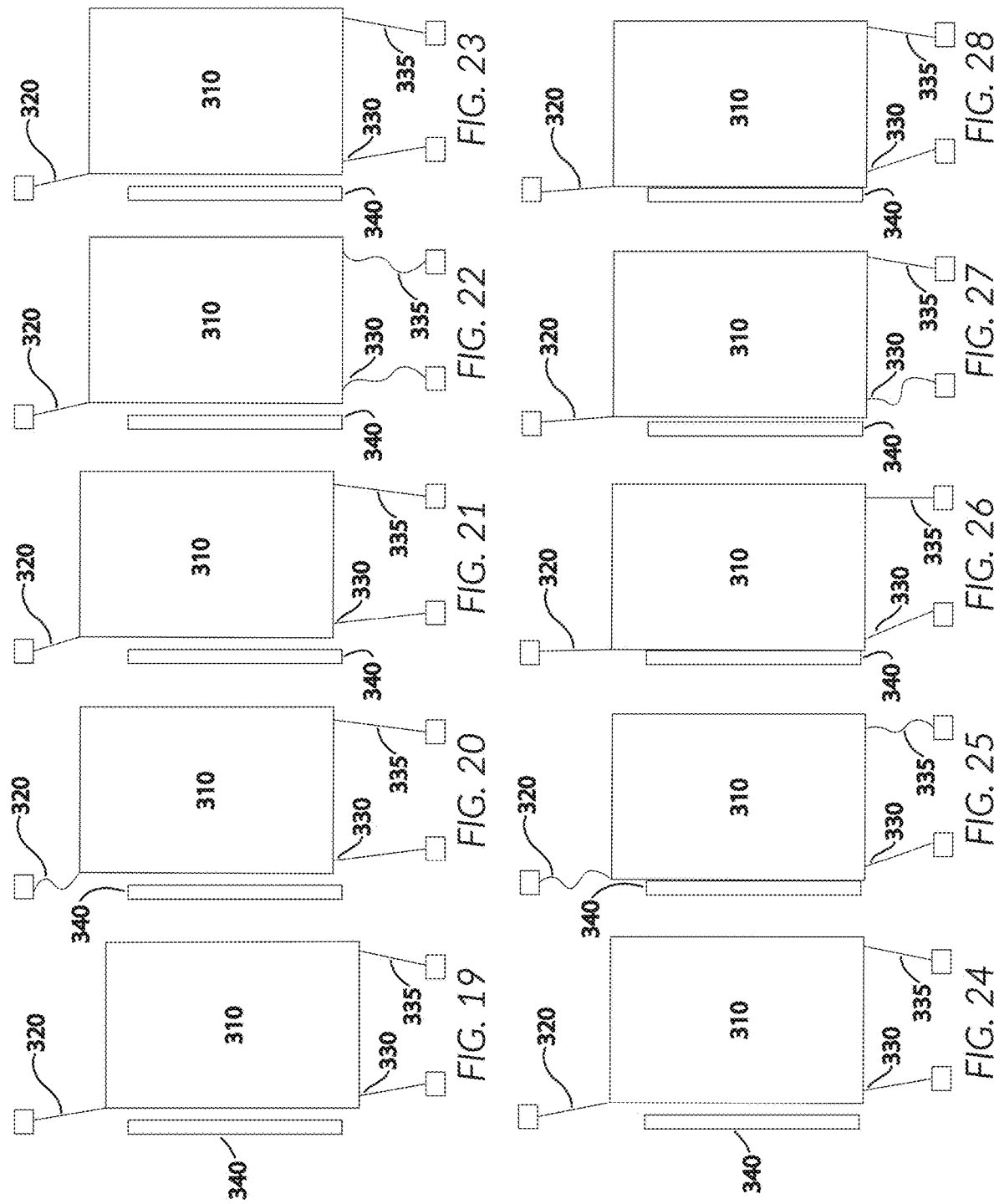

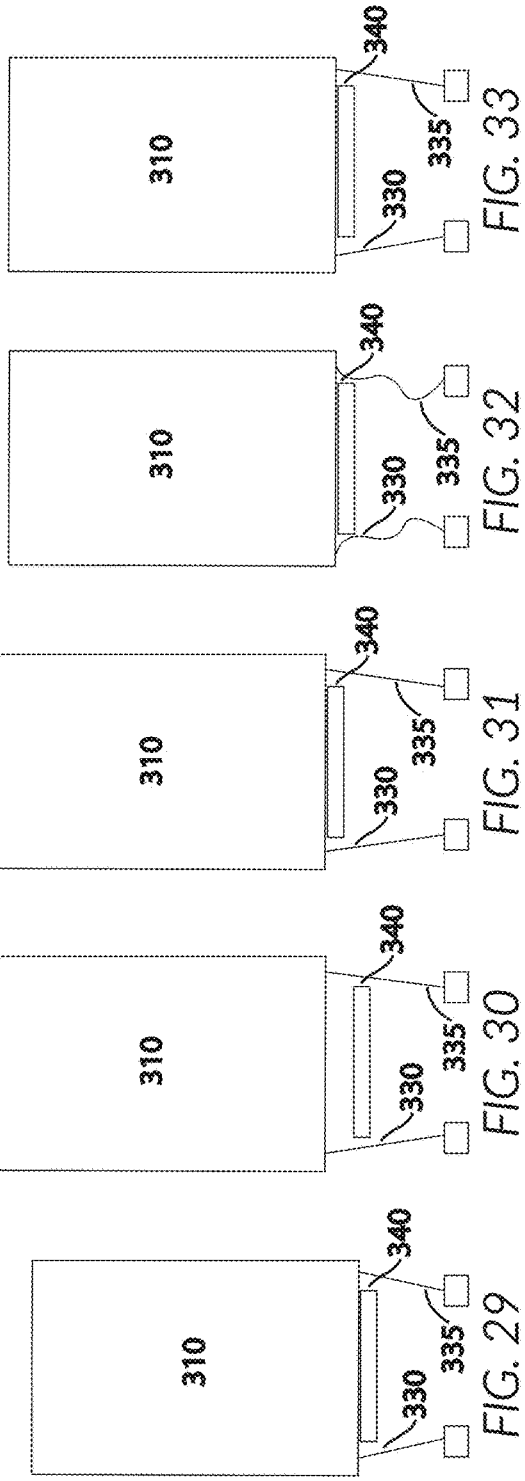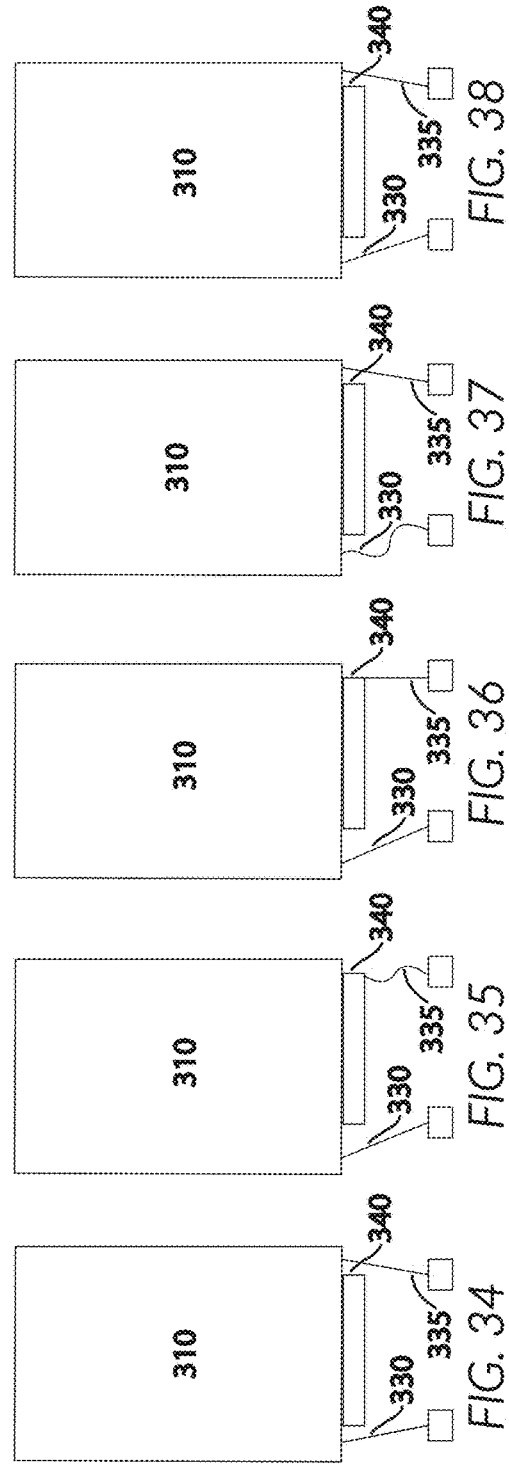

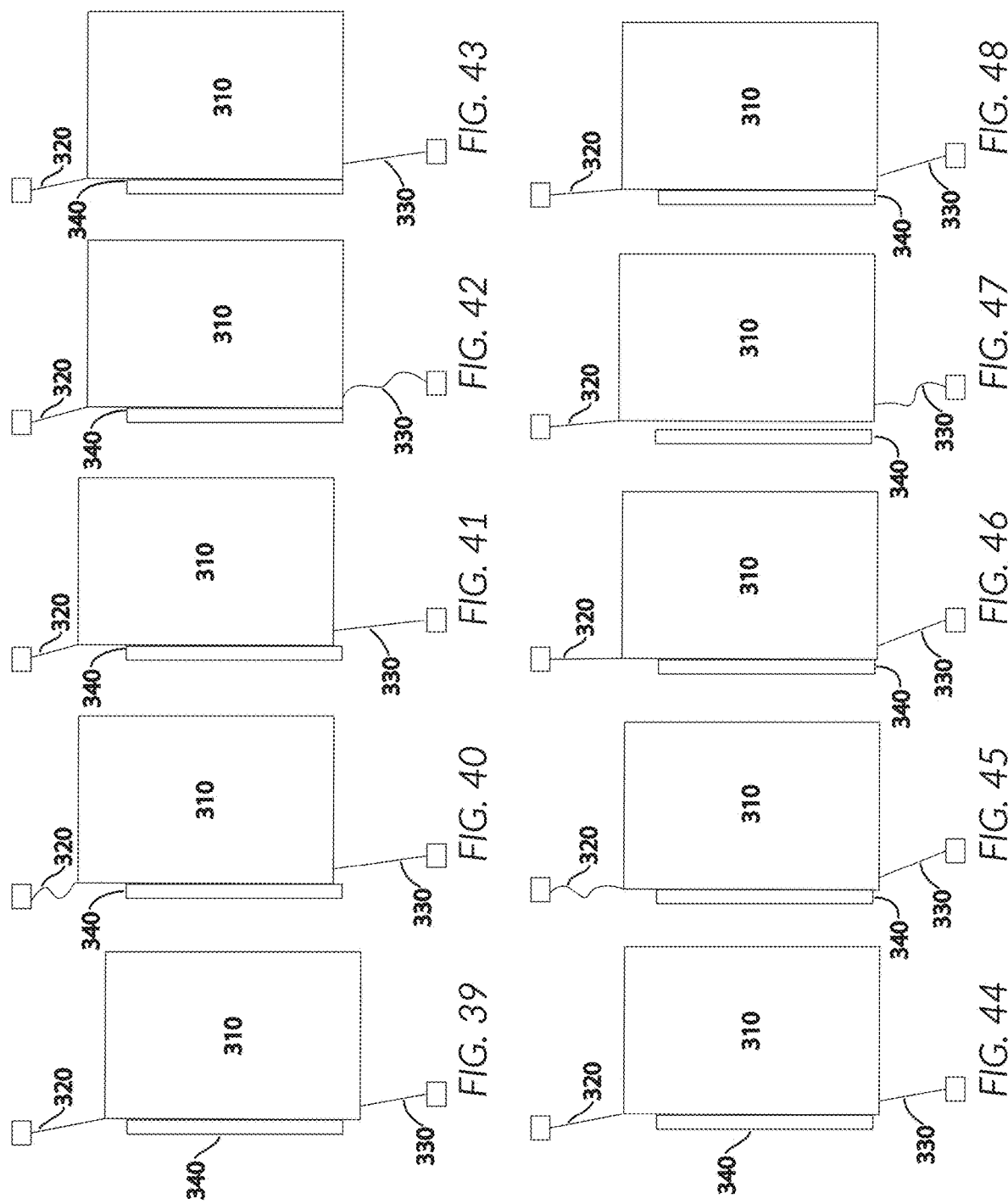

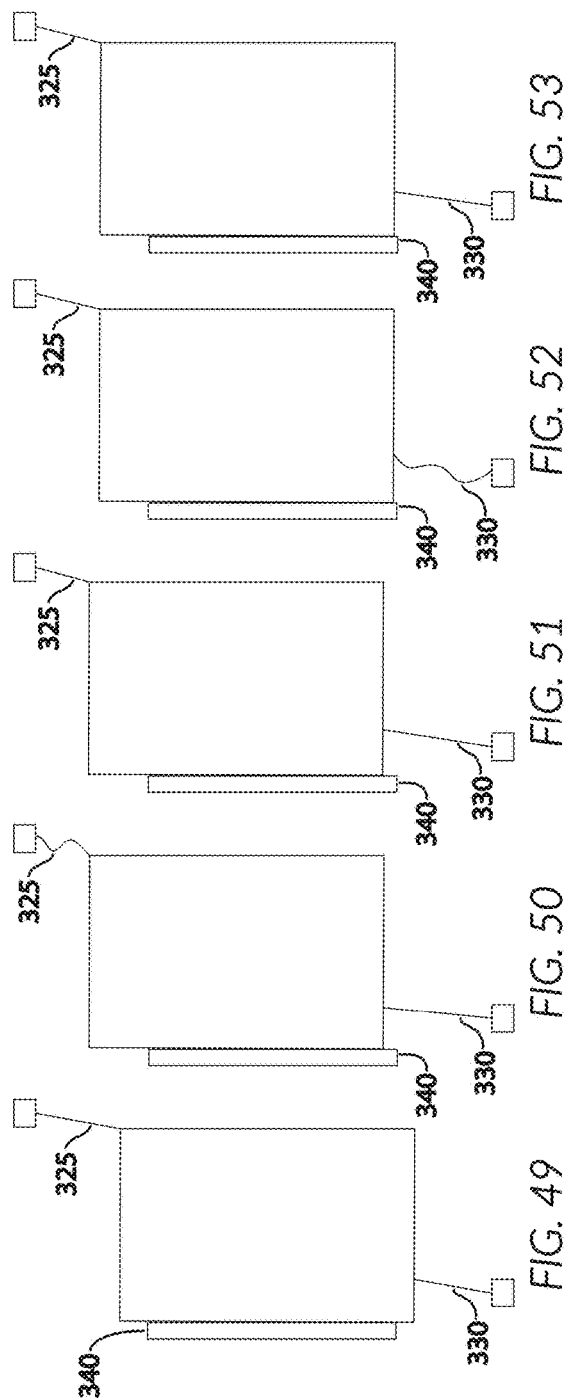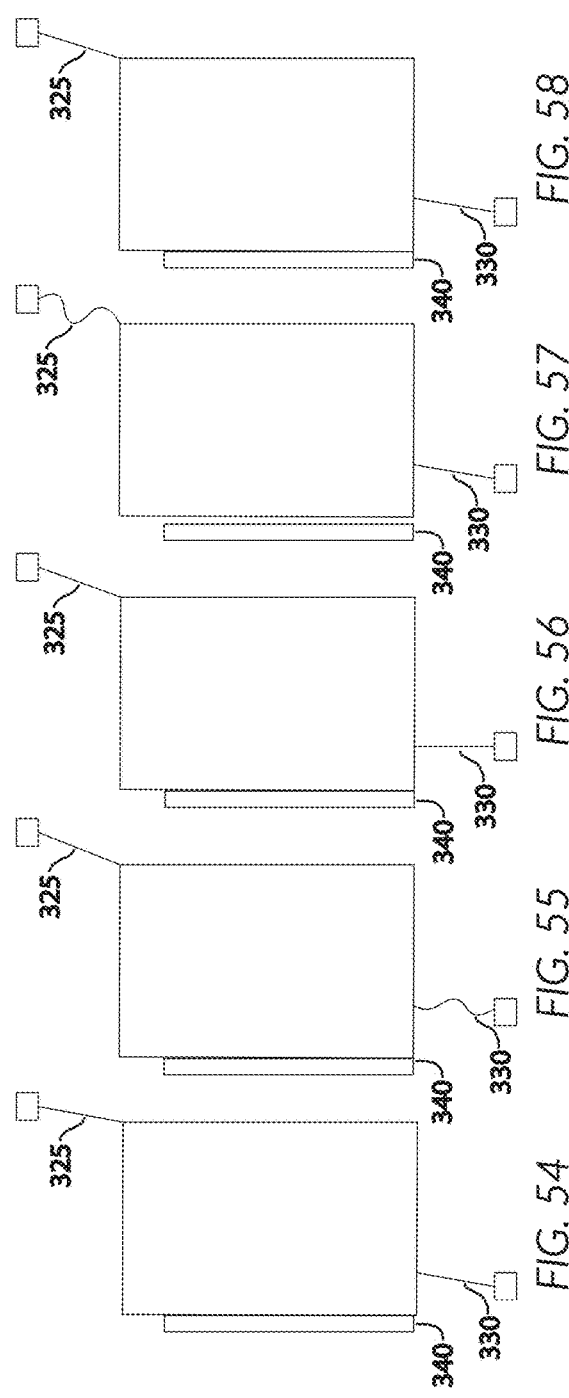

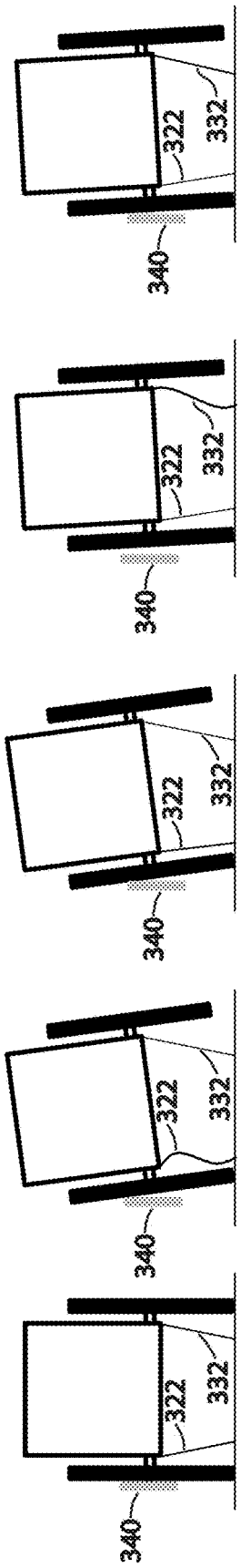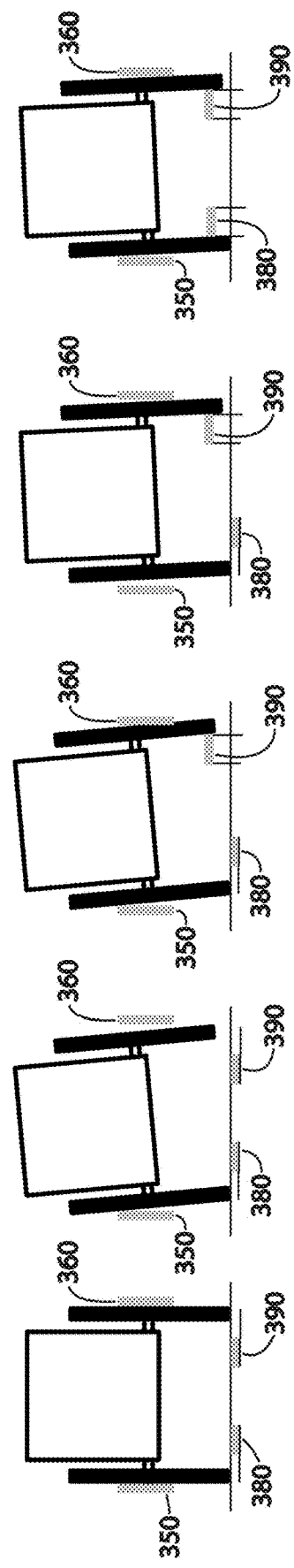

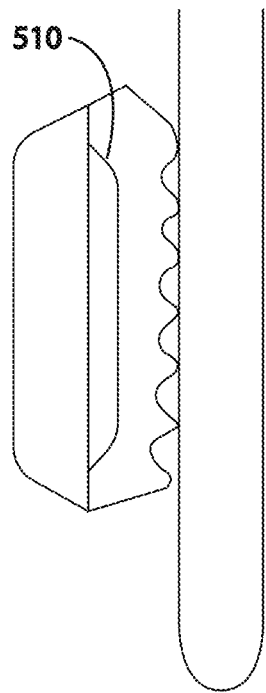
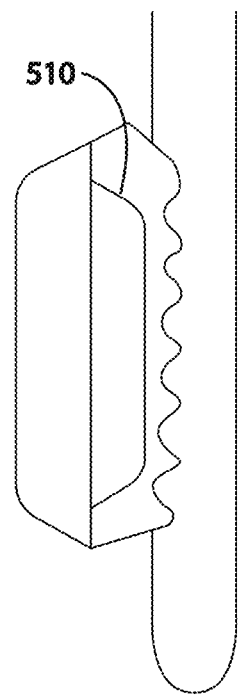
FIG. 77　　FIG. 78
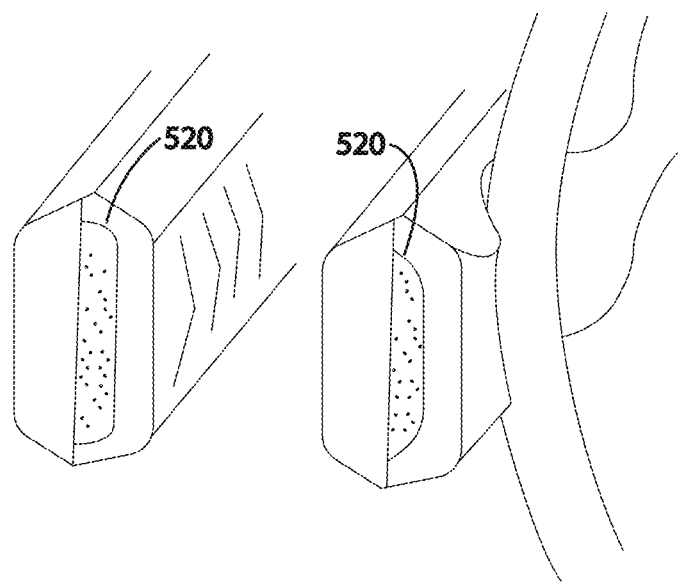
FIG. 79　　FIG. 80

REAR FACING →

← FWD FACING

ADVERSE DRIVING EVENT DATA RECORDER FOR A WHEELCHAIR SECUREMENT SYSTEM

CROSS-REFERENCE TO RELATED APPLICATIONS

This application is a continuation of U.S. patent application Ser. No. 17/611,692, filed on Nov. 16, 2021, which is a national stage filing of PCT Application No. PCT/US2020/034186, filed on May 22, 2020, which claims priority to U.S. Provisional Patent Application No. 62/851,466, filed on May 22, 2019, the contents of which are incorporated herein by reference. Further, U.S. Provisional Patent Application No. 62/751,277, filed on Oct. 26, 2018 and U.S. Provisional Patent Application No. 62/825,325, filed on Mar. 28, 2019, are incorporated herein by reference.

FIELD OF THE DISCLOSURE

The embodiments described and claimed herein relate generally to securement systems for mobility devices, and more particularly to a comprehensive energy management system for controlling excursion of a wheeled mobility device and its occupant during various adverse driving scenarios and modes, such as vehicle impacts and aggressive maneuvers.

BACKGROUND

In the current state of automotive safety systems, it is common for belt pre-tensioners, deployable airbags, and other timed safety systems to be utilized. These safety systems rely on a crash signal originating from the vehicle. At the time of a collision, the vehicle system will determine that a collision of a certain magnitude has occurred, which will then send an immediate signal to the vehicle safety systems. These safety systems in turn deploy as quickly as possible, in order to be functioning before the force of the collision is transferred to the occupant. Unfortunately, these existing vehicle safety systems are not transferrable to secure passengers seated in their wheeled mobility device in the vehicle during transit. This is because there are significant differences between securing an occupant in an ambulatory passenger seat in a vehicle and securing an occupant in a wheelchair passenger's seat (i.e., the wheeled mobility device/wheelchair).

One such difference relates to the seat or chair, which in all safety systems is a critical component. The seat for an ambulatory passenger is integral with the vehicle and can be considered to be fixed rigidly in place to the vehicle during adverse driving conditions. The shape of the seat is designed for crash support of the occupant, and the seat is designed to not move during a crash. In that respect, seats for ambulatory passengers will not contribute to additional passenger movement nor will it interfere with the forward excursions of the occupant during impact. Moreover, seats for ambulatory passengers will support rear excursions of the occupant (i.e., will block and load limits the ambulatory passenger's rear movement) and will significantly reduce the associated rear excursion. Therefore, in the current state of technology for ambulatory passengers, the seating system does not exacerbate excursions and only supports the passenger during excursions.

The same is not true for a wheeled mobility device, where the passenger's seating system is not integral to the vehicle. Rather, the wheeled mobility device is temporarily fixed to the vehicle, in some cases with securements systems that can be "elastic" in nature and can give and stretch and be significantly affected by an adverse driving condition. For example, a typical system will include tie-downs formed of webbing that not only will stretch and allow movement of the wheeled mobility device during transit, but also may unspool (i.e., even when the spool is locked, loosely wrapped webbing can spool out). In the example of a forward impact, both the wheeled mobility device (i.e., the seat) and the passenger commence to move forward (i.e., forward excursions), albeit at different times and different rates. In the example of a rebound (or a rear impact), both the mobility device and the passenger commence to move rearward (i.e., rearward excursion), again, at different times and different rates. The mobility device and the passenger can also both experience side excursions in the case of side impacts, roll overs, or in front/rear impacts that involve rotational forces (i.e., mobility device and passenger can move along any axis, including vertical and horizontal axes), again, at different times and different rates.

Herein, unless the context suggests otherwise, the term "forward" refers to the "forward" direction of the vehicle, not the direction of the wheeled mobility device which can be installed in forward-facing, rear-facing, and side-facing orientations. Forward, rearward, sideward, and vertical excursions of the wheeled mobility device are limited by tie-downs, bumpers and/or other securement members, whereas the excursion of the passenger is separately limited by the combination of the occupant restraints and the chair (e.g., in a forward-facing system: the occupant restraints limit movement of the passenger in the case of a forward excursion, the seat back limits movement of the passenger in the case of a rear excursion, the seat bottom limits movement of the passenger in the case of a downward excursion, the occupant restraints limit movement of the passenger in the case of an upward excursion, and occupant restraints and armrests limit movement of the passenger in the case of a side excursion).

In such a dynamic environment, both objects (i.e., the passenger and the chair) move independently and can interfere with each other's respective excursions. For example, the wheeled mobility device can compress the occupant against the occupant restraints (thereby exposing the occupant restraints to the combined weight of the occupant and the chair) and/or exacerbate or reduce the occupant's excursion (e.g., in a forward facing system, the wheeled mobility device can propel the occupant in a forward excursion and slow down the occupant a rearward excursion). The occupant can similarly impact the wheeled mobility device's excursion (e.g., the occupant can push the wheeled mobility device and expose the tie-downs to the combined weight of the chair and the occupant).

Additionally, the fastening or tie-down methods for an ambulatory seat and a wheelchair are drastically different. In the case of a regular vehicle seat that is fixed via fasteners (i.e., bolts or a weldment), the method of securement does not contribute to any additional forward excursion of the seat. For example, if the seat is bolted down, the bolts do not allow the seat to move in impact and do not exacerbate a rebound event. However, in the case of a wheelchair passenger being secured, the method of securement usually allows for and exacerbates excursions. In the case of a 4-point tie down system that utilizes retractors with flexible webbing, webbing stretch along with spooling-out can contribute to an increase in excursions (i.e., the more stretch/webbing movement the more the chair can travel). Moreover, the energy stored in the webbing due to stretching can be released at the end of an initial excursion and exacerbate a rebound event (i.e., a secondary excursion in an opposite direction) and cause oscillations of both the wheeled mobility device and passenger. Further yet, during excursions, certain retractors can experience undesirable slack in its webbing, whereby the retractor will be unable to prevent or minimize a rebound event.

The separate securement of the occupant and wheeled mobility device allows for independent and dynamic movement (or reactions) and interactions for both the occupant and the chair. Because they do not take into account a moving seat, existing vehicle safety systems for ambulatory passengers are inadequate and cannot be utilized to secure a wheeled mobility device and its occupant in a vehicle. Existing vehicle safety systems also do not take into account the separate nature of the secondary and tertiary events (i.e., occurring at different times) for the seat and occupant, such as rebounds, oscillations, or whiplash. Existing vehicle safety systems also are designed to activate at the moment of impact, prior to the occupant feeling the forces or moving forward significantly, and do not take into account the type of secondary and tertiary events that occur in wheelchair securement systems, including but not limited to rebounds exacerbated by the release of stored energy in tie-downs and the creation of unwanted slack in tie-downs.

Accordingly, there is a need in the art for a vehicle safety system and controller that takes into consideration the independent and dynamic nature of wheeled mobility device securement. Such a controller could utilize various types of safety equipment such as fast-acting tensioners or releasers for wheelchair tie downs (e.g., retractors) and occupant belt systems (which could also include retractors), and other fast-acting vehicle safety systems (e.g., movable bumpers, air bags, secondary securement members) and control them in such a way as to produce the best possible outcome for the safety of the passenger. Such a controller could be programmed to understand, or determine and analyze, the crash or adverse event occurring and the reactions or anticipated reactions of the wheeled mobility device and passenger, and then deploy the appropriate safety systems at the appropriate times.

SUMMARY OF THE EMBODIMENTS

The proposed embodiments solve the shortcomings of the prior art and can provide a comprehensive energy management system for any number of different wheeled mobility device securement systems. In one aspect, a system is configured to use tensioning and/or load-limiting technology in a way that takes into account the excursion of the wheelchair and the resultant secondary excursion (i.e., whiplash/rebound) or tertiary movements (oscillations) of that wheeled mobility device (i.e., after whiplash). Such a system could apply one or more tensioning events at predetermined or calculated moments in order to reduce secondary and tertiary excursions of the wheelchair. Additionally, the controller can ascertain or determine multiple states of crash or non-crash scenarios (e.g., can determine a long duration turn versus a heavy braking incident at 1 g versus a mild crash at 5 g, etc.) in order to select the appropriate safety system to utilize and to provide appropriate timing for the selected safety systems in the vehicle.

For example, in the case of a forward collision utilizing a four-point tie-down with the wheeled mobility device secured in a forward-facing position (occupant is facing toward the front of the vehicle, with two tie-downs in the front and two tie-downs in the rear), one embodiment of a controller could receive or register a crash signal at the moment of impact (either independently through integrated technology such as an accelerometer or alternatively received from a signal generated by the vehicle crash detection equipment), allowing for an initial tensioning similar to the current state of safety equipment (i.e., upon receipt of crash signal from the vehicle, the controller can trigger an occupant belt pre-tensioner and any other pre-tensioning equipment, including for the wheelchair tie-downs). Due to spooling-out and the elastic nature of the tie downs, the wheeled mobility device and occupant will begin their forward excursion, which will stretch the rear tie-downs and introduce slack into the front tie-downs (because typical auto-retracting retractors cannot spool in quickly enough during a crash event to take up the slack). The controller would then register (i.e., determine or approximate or sense) the moment of whiplash/rebound where the direction of excursion for the wheelchair or passenger changes from frontward to rearward. At this point-in-time, the controller will trigger a fast-acting tensioning device that will quickly pull in the slack webbing onto the retractor spool, which will help reduce the rearward excursion. The controller can be programmed to trigger further tensioning devices at appropriate times to minimize further oscillations. For example, the controller can register the moment the wheeled mobility device changes direction from rearward to forward, and trigger fast-acting tensioning devices to spool up any slack in the webbing for the rear retractors. Each tensioning device could be configured to trigger more than once, whereby multiple oscillations that may occur during a severe accident can be controlled. Similarly, the occupant restraints and wheelchair tie-downs could include multiple tensioning devices, where one tensioning device is triggered for each oscillation.

Other embodiments, which include some combination of the features discussed above and below, and other features which are known in the art, are contemplated as falling within the claims even if such embodiments are not specifically identified and discussed herein.

BRIEF DESCRIPTION OF DRAWINGS

FIGS. 4-8 are a collection of schematics demonstrating an exemplary implementation of an energy management system to control oscillating excursions in a forward-facing, four-point tie-down securement system during a front impact;

FIGS. 9-13 are a collection of schematics demonstrating an exemplary implementation of an energy management system to control oscillating excursions in a forward-facing, four-point tie-down securement system during a left-side impact, with the rear tie-downs angled away from each other as they extend from the vehicle to the wheeled mobility device;

FIGS. 14-18 are a collection of schematics demonstrating an exemplary implementation of an energy management system to control oscillating excursions in a forward-facing, four-point tie-down securement system during a left-side impact, with the rear tie-downs angled toward each other as they extend from the vehicle to the wheeled mobility device;

FIGS. 19-23 are a collection of schematics demonstrating an exemplary implementation of an energy management system to control oscillating excursions in a forward-facing, three-point tie-down with bumper securement system during a front impact;

FIGS. 24-28 are a collection of schematics demonstrating an exemplary implementation of an energy management system to control oscillating excursions in a forward-facing, three-point tie-down with bumper securement system during a left-side impact;

FIGS. 29-33 are a collection of schematics demonstrating an exemplary implementation of an energy management system to control oscillating excursions in a first embodiment of a forward-facing, two-point tie-down with bumper securement system during a front impact;

FIGS. 34-38 are a collection of schematics demonstrating an exemplary implementation of an energy management system to control oscillating excursions in a first embodiment of a forward-facing, two-point tie-down with bumper securement system during a left-side impact;

FIGS. 39-43 are a collection of schematics demonstrating an exemplary implementation of an energy management system to control oscillating excursions in a second embodiment of a forward-facing, two-point tie-down with bumper securement system during a front impact;

FIGS. 44-48 are a collection of schematics demonstrating an exemplary implementation of an energy management system to control oscillating excursions in a second embodiment of a forward-facing, two-point tie-down with bumper securement system during a left-side impact;

FIGS. 49-53 are a collection of schematics demonstrating an exemplary implementation of an energy management system to control oscillating excursions in a third embodiment of a forward-facing, two-point tie-down with bumper securement system during a front impact;

FIGS. 54-58 are a collection of schematics demonstrating an exemplary implementation of an energy management system to control oscillating excursions in a third embodiment of a forward-facing, two-point tie-down with bumper securement system during a left-side impact;

FIGS. 67-71 are a collection of schematics demonstrating an exemplary implementation of an energy management system to control oscillating excursions in a forward-facing, tie-down-and bumper-based securement system during a right-side rollover;

FIGS. 72-76 are a collection of schematics demonstrating an exemplary implementation of an energy management system to control oscillating excursions in a forward-facing, compression-based securement system during a right-side rollover;

FIGS. 77-78 depict a bumper having a safety device in the form of an inflatable bladder;

FIGS. 79-80 depict a bumper having a safety device in the form of a magnetorheological-fluid-filled bladder;

Figure 1:
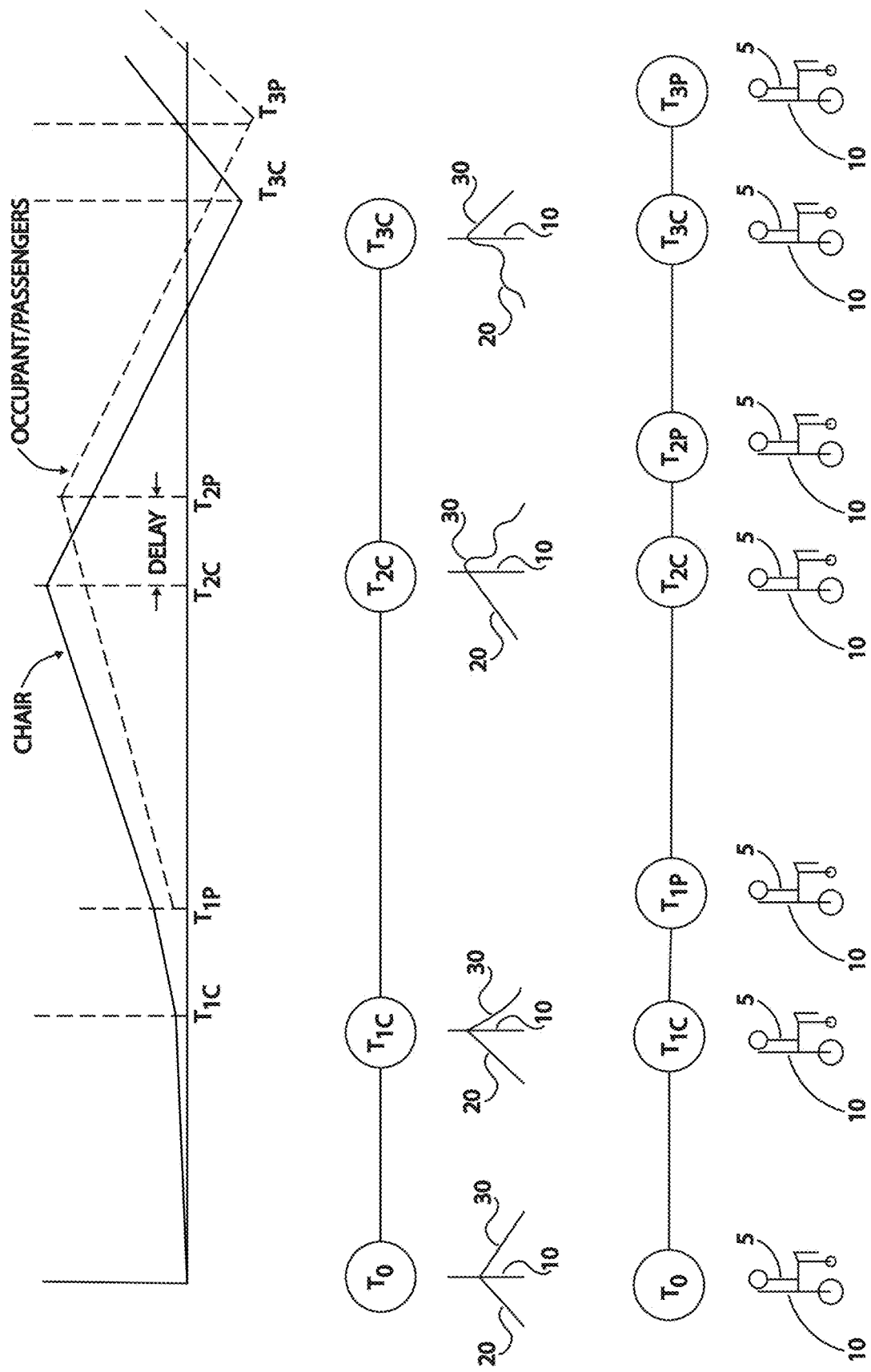
FIG. 1 is a collection of diagrams that shows the independent relationship and dynamic nature of the movements of a wheeled mobility device and its passenger during a forward impact.

It should be understood that the drawings are not necessarily to scale and that the embodiments are sometimes illustrated by graphic symbols, phantom lines, diagrammatic representations and fragmentary views. In certain instances, details which are not necessary for an understanding of the embodiments described and claimed herein or which render other details difficult to perceive may have been omitted. It should be understood, of course, that the inventions described herein are not necessarily limited to the particular embodiments illustrated. Indeed, it is expected that persons of ordinary skill in the art may devise a number of alternative configurations that are similar and equivalent to the embodiments shown and described herein without departing from the spirit and scope of the claims.

Like reference numerals will be used to refer to like or similar parts from Figure to Figure in the following detailed description of the drawings.

DETAILED DESCRIPTION OF THE EMBODIMENTS

FIG. 1 is a diagram that demonstrates the independent relationship and dynamic nature of the excursions of a wheeled mobility device and its passenger during a typical, forward vehicle impact. In the line chart at the top of FIG. 1, the y-axis represents the excursion distance relative to initial position, the x-axis represents time, the solid line represents the excursion of the wheeled mobility device, and the dashed line represents the excursion of the passenger. Time T0, at the origin of the chart, represents the time of the impact event, which in this example is a forward impact (i.e., where the vehicle sees a rearward directed force that accelerates the vehicle in a rearward direction; for example, stops the vehicle from forward travel). Time T1$c$ represents the time when the chair (i.e., the wheeled mobility device) will begin its forward excursion. Time T1$p$ represents the time when the passenger will begin its forward excursion. Time T2$c$ represents the time when the chair ends its forward excursion and begins its rebound/whiplash, or rearward excursion. Time T2$p$ represents the time when the passenger ends its forward excursion and begins its rebound/whiplash, or rearward excursion. Time T3$c$ represents the time when the chair ends its rearward excursion and begins another rebound, or second forward excursion. Time T3$p$ represents the time when the passenger ends its rearward excursion and begins another rebound, or second forward excursion. Additional oscillations may occur depending on the severity of the impact, in a similar manner as shown for the previous excursions.

As discussed above, the mechanisms in typical automatic retractors are not fast enough to react during an accident to draw in loose webbing that results from chair movement. This will result in the introduction of slack in the belts of various retractors during the various phases of the accident. The introduction of slack is depicted in a series of schematics directly below the line chart, where the vertical line 10 represents the chair, the angled line 20 on the left of the chair 10 represents the rear tie-down that secures the chair 10 to the floor, and the angled line 30 on the right of the chair 10 represents the front tie-down that secures the chair 10 to the floor. At both T0 and T1c, before the chair 10 begins its excursion, the rear tie-down 20 and front tie-down 30, if properly secured, will be taut as shown. At T2c, after the chair 10 has moved forward (forward excursion), the rear tie-down 10 will still be taut; however, slack webbing will be introduced into the front tie-down 30, as shown. Beginning at T2c, the chair will begin its rear excursion, which will be exacerbated by the energy stored in the stretched rear tie-downs 20. At T3c, after the chair 10 has moved rearward (rearward excursion), the slack in the front tie-down 30 will be removed, and slack will be introduced into the rear tie-down 20, as shown.

Notably, it can be seen that there can be significant delays between when the chair begins and ends any given excursion (i.e., T1c, T2c, T3c) and when the passenger begins and ends any given excursion (i.e., T1p, T2p, T3p). This can result in interactions between the chair and the passengers, as shown in a series of schematics at the bottom of FIG. 1. At T0 and T1c, the passenger can be assumed to be sitting in a normal position. Beginning at T1c and continuing until T1p, the chair 10 will begin its forward excursion while the passenger 5 will be generally stationary, both relative to the vehicle. This introduces the possibility that the seat back of the chair 10 will hit the back of the passenger 5, as shown schematically at T1p. The chair 10 could then proceed to compress the passenger 5 against the occupant restraints, thereby increasing the chance of injury. In addition, by exerting force on the passenger 5, some amount of the force from the chair 10 movement will be transferred from the tie-downs to the occupant restraints, a less than ideal situation. After contacting each other, the chair 10 and passenger 5 may proceed their forward excursion in concert until T2c, when the chair 10 rebounds, while the passenger 5 continues his or her forward excursion. By time T2p, a space may again be introduced between the chair 10 and the passenger 5, as shown schematically. The space between the chair and passenger may later be closed, particularly after T3c, after the chair 10 ends its initial rebound and begins a secondary rebound in a forward direction. The seat back of the chair 10 may again contact the back of the passenger 5, as shown schematically at T3p.

As it can be appreciated, the wheeled mobility device and passenger will exhibit independent excursions and may dynamically interact in other adverse driving conditions, such as impacts on other sides of the vehicle, angled impacts, offset impacts, rollovers, heavy braking, sharp turns, and long duration turns. Accordingly, there is a need for an energy management system that can interact with various safety systems to control the energy associated with the various excursions of the wheeled mobility device and passenger during such adverse driving conditions.

Figure 2:
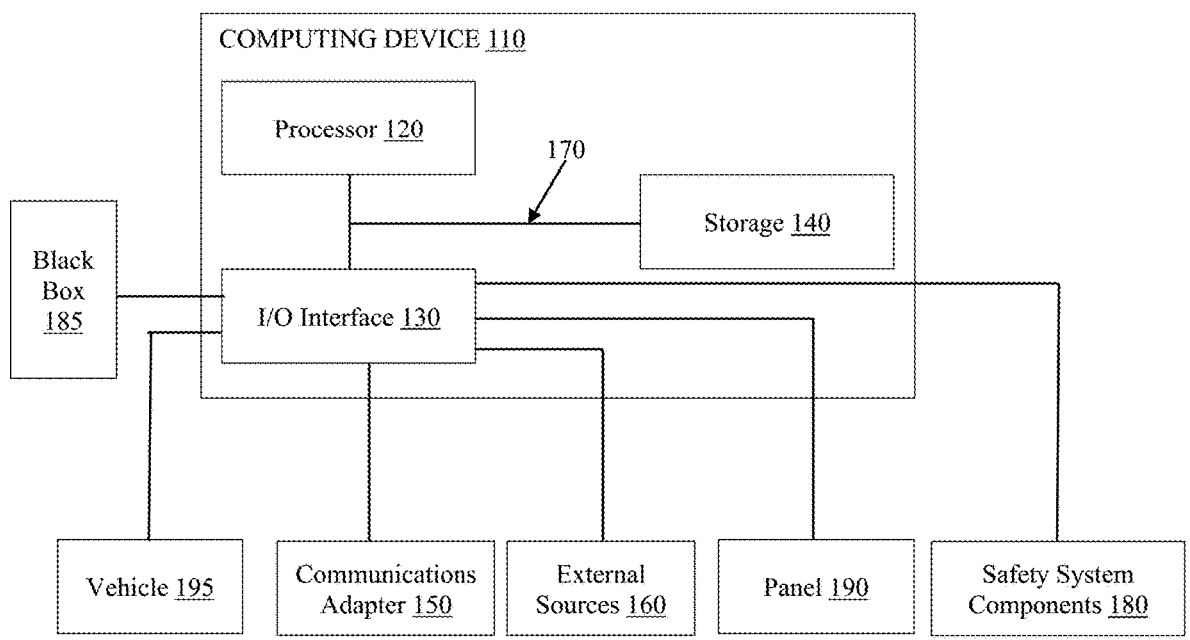
FIG. 2 is shows an exemplary energy management system by which various safety systems in a wheeled mobility device securement system can be implemented.

FIG. 2 shows such an energy management system 100 by which various safety systems can be automated. The system 100 may include a computing device 110 that can perform some or all of the processes described above and below. The computing device 110 may include a processor 120, storage 140, an input/output (I/O) interface 130, and a communications bus 170. The bus 170 connects to and enables communication between the processor 120 and the components of the computing device 110 in accordance with known techniques. Note that in some computing devices there may be multiple processors incorporated therein, and in some systems there may be multiple computing devices.

The processor 120 communicates with storage 140 via the bus 170. Storage 140 may include memory, such as Random Access Memory (RAM), Read Only Memory (ROM), flash memory, etc., which is directly accessible. Storage may also include a secondary storage device, such as a hard disk or disks (which may be internal or external), which is accessible with additional interface hardware and software as is known and customary in the art. Note that a computing device 110 may have multiple memories (e.g., RAM and ROM), multiple secondary storage devices, and multiple removable storage devices (e.g., USB drive and optical drive).

The computing device 110 may also communicate with other computing devices, computers, workstations, etc. or networks thereof through a communications adapter 150, such as a telephone, cable, or wireless modem, ISDN Adapter, DSL adapter, Local Area Network (LAN) adapter, or other communications channel. Note that the computing device 110 may use multiple communication adapters for making the necessary communication connections (e.g., a telephone modem card and a LAN adapter). The computing device 110 may be associated with other computing devices in a LAN or WAN. All these configurations, as well as the appropriate communications hardware and software, are known in the art.

The computing device 110 provides the facility for running software, such as Operating System software and Application software. Note that such software executes tasks and may communicate with various software components on this and other computing devices. As will be understood by one of ordinary skill in the art, computer programs such as that described herein are typically distributed as part of a computer program product that has a computer useable media or medium containing or storing the program code. Such media may include a computer memory (RAM and/or ROM), a diskette, a tape, a compact disc, a DVD, an integrated circuit, a programmable logic array (PLA), a remote transmission over a communications circuit, a remote transmission over a wireless network such as a cellular network, or any other medium useable by computers with or without proper adapter interfaces The computing device 110 may be located onboard a wheeled mobility device securement system, or may be located remotely in the vehicle or elsewhere. In general, the computing device 110 may be programmed to or includes a computer program product that may be configured to: monitor or ascertain various characteristics of one or more of the vehicle, the wheeled mobility device securement system (including but not limited to the types of securement systems described herein), the wheeled mobility device, and the passenger; determine or approximate or ascertain the timing for various phases of an adverse driving condition, select an appropriate safety system or systems to trigger in any given phase; and trigger the appropriate safety system(s) at the ideal time(s). The computing device 110 may operate with machine language and receive relevant information, signals, data or input from one or more sensors, devices, or other external sources (collectively, 160), to inform the energy management process. The computing device may also receive additional information, signals, data or input, including from the storage 140 and/or one or more communications adapter 150, the vehicle 195, and user panels 190. The computing device 110 may then determine appropriate actions and initiate them via designated outputs. For example, the computing device 110 may issue instructions, in the form of signals, to various safety system components 180 for the securement system, including but not limited to fast-acting tensioners, moveable bumpers, air bags, and supplemental securement members, according to logical algorithm included with the computer program product.

The processor 120 may be configured to communicate with the vehicle operator and/or the wheelchair passenger through one or more optional interface panels 190. The panels 190 may contain command switches or buttons that produce signals, as well as indicator lights, audible alarms, and voice, with optional text or full graphic displays with touch-sensing capabilities. The panels 190 may be a wall-mounted unit, a wired or wireless remote control, or even an application running on a tablet or mobile device, such as an iPhone.

The computing device 110 may be configured communicate with the vehicle 195 (e.g., the controller, collision detection system, etc.) to send information regarding the status of the securement and safety systems, as well as to receive information concerning the status of the vehicle. For example, the computing device 110 may be configured to send signals to the vehicle 195 indicating that the wheeled mobility device is properly secured by the securement system, whereby the vehicle may be interlocked until a proper securement signal is received. The computing device 110 may be configured to receive signals from the vehicle 195 representative of the status and/or various dynamic conditions of the vehicle, including but not limited to: the location, direction of travel, velocity, and acceleration/deceleration of the vehicle along one or more of the x-, y-, and z-axes; the time an impact occurs; the magnitude, direction and/or type of the impact; the location, distance, direction, velocity, and/or approaching velocity of other vehicles or obstructions; the probability of a collision occurring; estimated time of collision; vehicle stopped; vehicle neutralized, in gear, out of gear, in park, powered down, etc.; vehicle brake applied; vehicle accelerator applied; steering wheel position; vehicle door status; and any other information that may be accessible from the vehicle systems.

Any such information that can be obtained from the vehicle may also be ascertained or calculated independently by the computing device 110 and associated sensors and other technology, including accelerometers, GPS receivers, sonar, and the like. For example, the computing device 110 may be configured to communicate with external sources 160 to receive information concerning the vehicle. More particularly, the computing device 110 may be configured to receive inputs, from various external sources 160 such as proximity sensors, accelerometers, sonar-based systems (or similar systems using different technology, such as lidar), GPS receivers, video analytic systems, and collision detection systems, that are representative of the status and/or various dynamic conditions of the vehicle, including but not limited to: the location, direction, velocity, and acceleration/deceleration of the vehicle along one or more of the x-, y-, and z-axes; the time an impact occurs; the magnitude, direction and/or type of the impact; the location, distance, direction, velocity and/or approaching velocity of other vehicles or obstructions; the probability of a collision occurring; estimated time of collision; vehicle stopped; vehicle neutralized, in gear, out of gear, in park, powered down, etc.; vehicle brake applied; vehicle accelerator applied; steering wheel position; and vehicle door status.

The computing device 110 may be configured to communicate with external sources 160 to receive information concerning the wheeled mobility device securement system. In the simplest of systems, a sensor could provide a signal to the computing device 110 indicating that a wheeled mobility device is being secured. See, for example, U.S. Provisional Patent Application No. 62/751,277, filed on Oct. 26, 2018, which is incorporated herein by reference. In more complex systems, a one or more sensors could be used to provide various characteristics of the securement system. For example, in a tie-down based securement system, sensors may be used to detect how many, which, and the type of tie-down being used to secure a wheeled mobility device, whether and the type of the occupant restraints being used to secure the passenger, the tension in the strap for the tie-downs and occupant restraints, and the vertical and horizontal angles of the various tie-downs and occupant restraints. In one embodiment, sensors (e.g., a proximity sensor) could be sewn into the webbing of each retractor whereby a signal can be sent to the computing device 110 when the webbing is either fully retracted, withdrawn partially, or withdrawn a predetermined distance. In other embodiments, sensors (e.g., encoders attached or associated with a tie-down spool) could be used to detect more precisely how much webbing or strap has been withdrawn. In addition, sensors (e.g., load cells, strain gauges, angle sensors, etc.) could be used with the wheelchair tie-downs and occupant restraints (e.g., at the connection point to the vehicle and/or wheeled mobility device, on the webbing/strap, on the spool or gearing, etc.) to detect the amount of tension and angles in the webbing/strap. In another embodiment, a video-based analytic system could be used to confirm which tie-downs and occupant restraints are being used, and to detect the length of webbing/strap that has been withdrawn from the retractor and the vertical and horizontal angles of the webbing/strap. If the tie-down system includes a moveable bumper, sensors (e.g., proximity sensors, motor current sensors, etc.) may be used to detect the position of bumper and the amount of force being exerted on the wheeled mobility device by the bumper. As another example, in a compression-based securement system, such as the Q'Straint Quantum, sensors (e.g., proximity sensors) could be used to confirm that the engagement members (bumpers) are properly engaged with the sides of a wheeled mobility device and to provide information concerning the position of the engagement members. Sensors (e.g., motor current sensors) could also be used to provide information representative of the force being exerted on the wheeled mobility device by the engagement members. A video-based analytic system could be used to provide information concerning the position of the engagement members. As another example, in a docking station-based system, such as the Q'Straint QLK, sensors (e.g., proximity sensors) could be used to confirm when a wheelchair bracket is properly engaged in the docking system.

The computing device 110 may be configured to communicate with external sources 160 to receive information concerning the wheeled mobility device. The computing device 110 may be configured to receive one or more inputs from one or more sensors or other devices 160 that are indicative of one or more of the following characteristics: a wheeled mobility device being present on the vehicle; the position of the WMD in the vehicle or in WMD securement system; the orientation of the WMD (forward-facing, rear-facing, side-facing); the type, size, weight, and/or center of gravity of wheeled mobility device being secured (or the combined weight or center of gravity of the wheeled mobility device and passenger); and/or WMD movement while the vehicle is in transit and during an adverse driving condition, including but not limited to its direction of movement, velocity, and acceleration/deceleration. Those sensors or devices 160 may include one or more of a floor pressure sensor that senses the wheel locations, proximity sensors, accelerometers mounted to the WMD or the hooks on the tie-downs, an array of IR beams, a WMD-mounted or occupant-retained RFID tag, WMD-mounted or occupant-retained QR code, and/or a camera and image recognition software (i.e., a video-based analytic system). See, for example, the various sensors disclosed in U.S. Provisional Patent Application No. 62/825,325, filed on Mar. 28, 2019, which is incorporated herein by reference.

The computing device 110 may be configured to communicate with external sources 160 to receive information concerning the passenger seated in the wheeled mobility device. The computing device 110 may be configured to receive one or more inputs from one or more sensors or other devices 160 that are indicative of one or more of the following characteristics: the identity of the passenger present on the vehicle; the position of the passenger, or any portion of the passenger (e.g., head, torso, arms, legs) in the vehicle or in WMD securement system; the orientation of the passenger (forward-facing, rear-facing, side-facing); the height, size, weight, or center of gravity of the passenger being secured (or the combined weight or center of gravity of the wheeled mobility device and passenger); and/or passenger movement while the vehicle is in transit and during an adverse driving condition, including but not limited to the passenger's direction of movement, velocity, and acceleration/deceleration. Those sensors or devices 160 may include one or more of a floor pressure sensor, proximity sensors, accelerometers mounted to the passenger or the occupant restraint, an array of IR beams, a WMD-mounted or occupant-retained RFID tag, WMD-mounted or occupant-retained QR code, and/or a camera and image recognition software (i.e., a video-based analytic system). See, for example, the various sensors disclosed in U.S. Provisional Patent Application No. 62/825,325, filed on Mar. 28, 2019, which is incorporated herein by reference.

The computing device 110 may also communicate with a central monitoring facility through the communications adapter 150, for example for diagnostic reasons and/or database and software updates, etc., or to provide updates regarding the status of the securement system (e.g., occupied, non-occupied, properly secured, and/or improperly secured). The central monitoring facility could also provide the computing device 110 with advanced scheduling information, including but not limited to the type, size, weight, and center of gravity of the wheeled mobility device to be picked up, along with the height, size, weight, and center of gravity of the passenger (or the combined weight and center of gravity of the wheeled mobility device and passenger).

As discussed above, the computing device 110 can receive input from a video-based analytic system. It is contemplated that intelligent feature-recognition software stored in the computing device 110, or in a separate computing device, may use video analytics or measurements to determine various characteristics of concerning the vehicle, the securement system, the wheeled mobility device, and the passenger, including but not limited to the characteristics recited above. In particular, the wheeled mobility device station on the vehicle can be monitored via cameras or other sensors that are linked to intelligent feature-recognition software. The computing system can autonomously process the situation and react with the appropriate function that provides the best rider experience and trip safety. Such functions could include recognizing the presence, location, velocity, and acceleration of a WM D and occupant and recognizing the type of WMD. If the WMD type is recognized (for instance, using RFID signal, QR code, image recognition, or other identification methods), this information can be used as an input in the securement process, and the system will secure the WMD with securement settings that are specific for the WMD type. These settings can have different parameters as force, position, monitoring and adjustment strategy (in case the chair needs to be re-secured during the ride). A database can be established to identify the various makes and models of WMD, based on encoded information within the RFID or QR code, or by recognizing key distinguishing features by camera. Once WMD type is identified, a set of bumper squeeze-force and/or tie-down tension criteria can be developed to optimize securement for each application. A reliable default squeeze-force and/or tie-down value(s) can be used in the event that no specific make or model is identified and/or referenced in the database. The database can be built and maintained at a central location where parameters for each WMD securement device can be downloaded with the latest version during scheduled maintenance.

The computing device 110 may be configured to send any and all data available to it (including but not limited to time; dynamic information concerning the vehicle, the wheeled mobility device securement system, the wheeled mobility device, and the occupant; and the actions taken by the computing device during an adverse driving condition, and when those actions were taken) to a black box 185 for storage in memory. The black box 185 is designed to withstand the forces of an impact and harsh environments, such as fire and water, and can be used after the adverse driving event for analysis purposes to understand and recreate the event.

Figure 3:
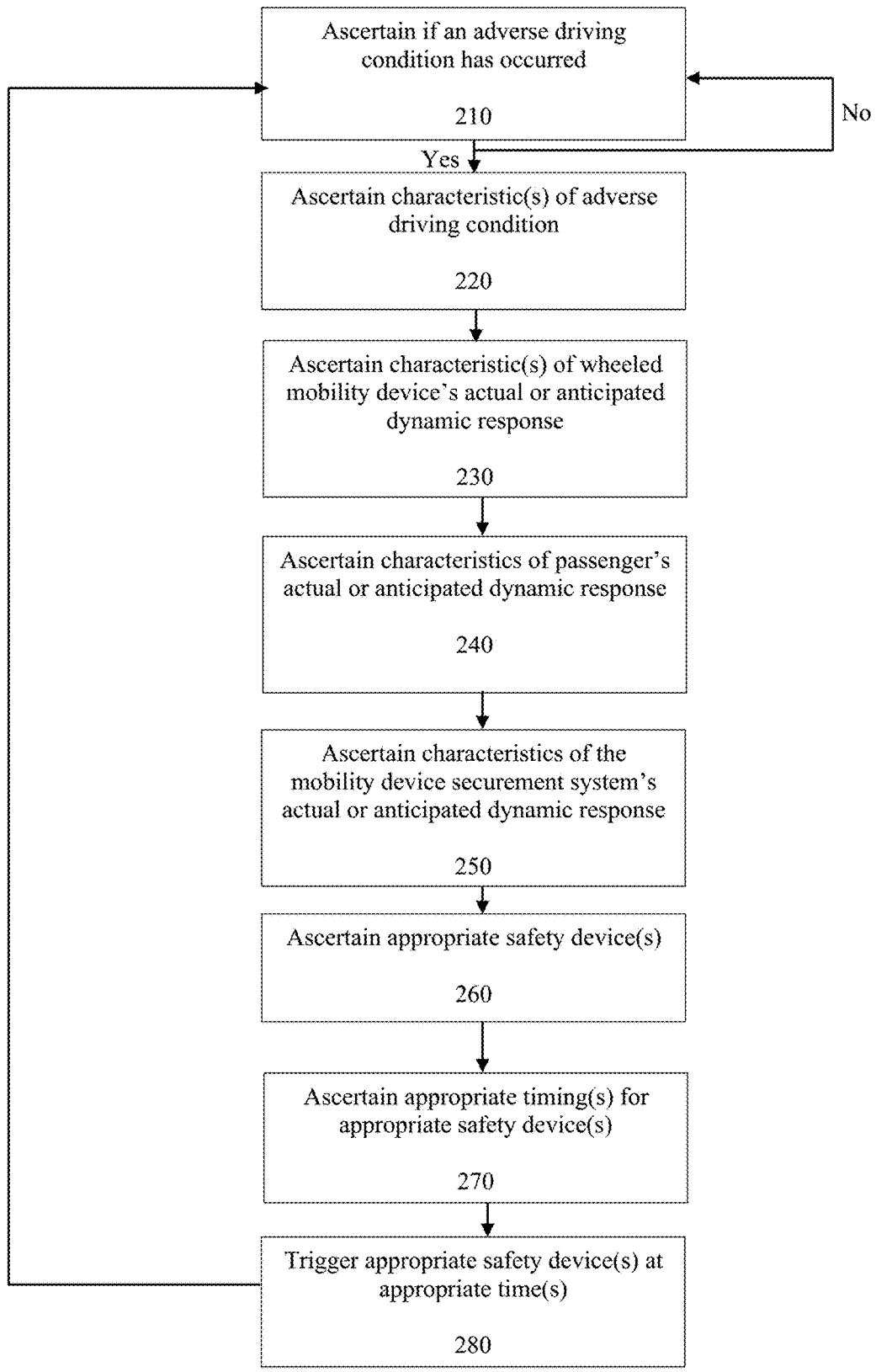
FIG. 3 is a flow chart showing exemplary logic that could be utilized by the exemplary energy management system to implement various safety systems.

FIG. 3 is a flow chart showing exemplary logic that could be programmed into the energy management system to trigger various safety systems. Although seven steps are shown, it is contemplated that embodiments could include as few as two steps (e.g., the first step and the eighth step 280) or many more than seven steps. Moreover, it is contemplated that the disclosed steps could be combined in any number of different permutations, and could be performed in a different order than depicted.

In the first step 210, the computing device 110 may be programmed to monitor whether and ascertain that an adverse driving condition has occurred. The first step 210 can be performed in one or more of many different ways, including but not limited to receiving and/or analyzing inputs from the vehicle 195 (e.g., the vehicle controller or the vehicle collision detection system) and/or from various external sources 160. For instance, the computing device 110 may receive a signal from the vehicle 195 or a separate collision detection system at the instant when the vehicle senses a collision or other adverse driving condition.

In the first step 210, the computing device 110 could additionally or alternatively ascertain that an adverse driving condition has occurred by monitoring one or more signals concerning the status and/or dynamic characteristics of the vehicle, the securement system, the wheeled mobility device, and/or the passenger. For example, the computing device 110 may receive a signal indicative of the vehicle acceleration, and subsequently determine if that acceleration (for example, a spike in acceleration and/or the direction and/or the magnitude) is indicative of an adverse driving condition. Additionally or alternatively, the computing device 110 may receive input indicative of the tension on the wheelchair tie-downs and/or occupant restraints, and subsequently determine if the tension seen by the respective device (for example, a spike in tension and/or the magnitude) is indicative of an adverse driving condition. Additionally or alternatively, the computing device 110 may receive input indicative of the pressure being exerted on the wheeled mobility device by a bumper, and subsequently determine if the pressure seen by the respective device (for example, a spike in tension and/or the magnitude) is indicative of an adverse driving condition. Additionally or alternatively, the computing device 110 may receive input from one or more accelerometers associated with the wheeled mobility device and/or the passenger, and subsequently determine if the acceleration(s) seen by the wheeled mobility device and/or passenger (for example, a spike in acceleration and/or the magnitude) is indicative of an adverse driving condition. Additionally or alternatively, the computing device 110 may receive input from a video-based analytic system such as the dynamic characteristics of the vehicle, the securement system, the wheeled mobility device and/or the passenger (e.g., the position, movement, velocity, and/or acceleration). The computing device 110 could determine if one or more of those characteristics is indicative of an adverse driving condition. The thresholds that should be applied by the computing device 110 for determining whether an event constitutes an adverse driving condition or not can be determined through routine experimentation by a person of ordinary skill in the relevant art.

In the event that the computing device 110 does not ascertain that an adverse driving condition has occurred, it will continue to monitor for one. However, if an adverse driving condition has occurred, in the second step 220, the computing device 110 may be programmed to ascertain one or more characteristics of the adverse driving condition. The computing device can ascertain a characteristic of the adverse driving condition in one or more of many different ways, including but not limited to receiving and/or analyzing inputs from the vehicle 195 (e.g., the vehicle controller or the vehicle collision detection system) and/or from various external sources 160. For example, the computing device could receive one or more input(s) indicative of the dynamic characteristics of the vehicle during the adverse driving condition (i.e., how the vehicle is responding to the adverse driving event), such as the location, direction of travel, velocity, and acceleration/deceleration of the vehicle along one or more of the x-, y-, and z-axes, the time an impact occurs, and/or the magnitude, direction and/or the nature/type of the impact.

In the second step 220, the computing device 110 could additionally or alternatively ascertain one or more characteristics of the adverse driving condition by monitoring one or more signals concerning the status and/or dynamic characteristics of the vehicle, the securement system, the wheeled mobility device, and/or the passenger (i.e., how any one or more of the vehicle, securement system, wheeled mobility device, and passenger are responding to the adverse driving event). This information could be used directly as indicative of the characteristic of the adverse driving condition. Alternatively, the computing device could use such information as a basis for characterizing the nature and magnitude of the adverse driving event for use in one or more of the following steps. For example, the computing device 110 may be programmed to ascertain whether the adverse driving condition is a collision or an aggressive maneuver based on the directions, magnitudes, and slopes of the previously mentioned dynamic characteristics. For example, tension on the two rear tie-downs could indicate a heavy braking event or a forward impact, depending on, e.g., magnitude and/or slope. Tension on two front tie downs could indicate a heavy acceleration event or a rear impact, depending on, e.g., magnitude and/or slope. Tension on one front tie-down and one rear tie-down could indicate a sharp or long duration turn, a side impact, a rollover, or a spin, depending on, e.g., magnitude and/or slope. The type of adverse driving condition could also be characterized on a more granular level (e.g., front collision, rear collision, right side collision, left side collision, roll-over, angled impact, offset impact, or combinations thereof). The thresholds that should be applied by the computing device 110 for determining whether an event constitutes a collision or an aggressive maneuver, and type and magnitude of collision/aggressive maneuver, can be determined through routine experimentation by a person of ordinary skill in the art. For the avoidance of doubt, it is contemplated that steps 1 and 2 could be satisfied by receipt of a single signal from the vehicle 195 or external source 160, for example, a signal indicative of the acceleration vector of an accident.

After ascertaining a characteristic of adverse driving condition in the second step 220, the computing device 110 could skip to the fourth step 240 through the sixth step 260, or proceed directly to the third step 230. In the third step 230, the computing device 110 may be programmed to ascertain one or more characteristics of the wheeled mobility device's dynamic response to the adverse driving condition. The computing device 110 may receive inputs that are indicative of the actual dynamic response of the wheeled mobility device. Additionally or alternatively, the computing device 110 may ascertain computationally or through table look-ups the anticipated dynamic response of the wheeled mobility device using the characteristic(s) of adverse driving condition from the second step 220 (e.g., the dynamic characteristics of the vehicle) as an input.

After ascertaining a characteristic of the wheeled mobility device's dynamic response in the third step 230, the computing device 110 could skip to the fifth step 250 or the sixth step 260, or proceed directly to the fourth step 240. In the fourth step 240, the computing device 110 may be programmed to ascertain one or more characteristics of the passenger's dynamic response to the adverse driving condition. The computing device 110 may receive inputs that are indicative of the actual dynamic response of the passenger. Additionally or alternatively, the computing device 110 may ascertain computationally or through table look-ups the anticipated dynamic response of the passenger using the characteristic(s) of adverse driving condition from the second step 220 (e.g., the dynamic characteristics of the vehicle) as an input.

In the fifth step 240, the computing device 110 may be programmed to ascertain one or more characteristics of the securement system's response to the adverse driving condition. The computing device 110 may receive inputs that are indicative of the actual dynamic response of the securement system. Additionally or alternatively, the computing device 110 may ascertain computationally or through table look-ups the anticipated dynamic response of the securement using the characteristic(s) of adverse driving condition from the second step 220 (e.g., the dynamic characteristics of the vehicle) as an input.

In the sixth step 260, the computing device will ascertain which safety devices are appropriate to use under the circumstances, using the information ascertained from one or more of the first through fifth steps 210, 220, 230, 240, 250 as an input. For example, during a forward collision or heavy braking event, it may be desirable to trigger a safety device that draws up slack in the forward restraints.

In the seventh step 270, the computing device 110 will ascertain the appropriate timing for triggering the safety device, using the information ascertained from one or more of the first through sixth steps 210, 220, 230, 240, 250, 260 as an input. Using the example from the sixth step 260, in a forward collision or heavy braking event, it may be desirable to trigger the safety device that draws up slack in the forward restraints at the moment of whiplash/rebound. In one embodiment, the moment of whiplash/rebound can be determined based on the passage of a predetermined period of time, or by look-up in a table or by calculation using an equation that cross-references a time differential (time delay from impact to rebound) with one or more characteristic(s) of the event (e.g., magnitude and/or direction of the acceleration or impact force vector), one or more characteristic(s) of the wheeled mobility device (e.g., the type and weight), one or more characteristic(s) of the occupant (e.g., weight, position relative to the wheeled mobility device), and/or one or more characteristic(s) of the securement system (e.g., the way in which the wheeled mobility device is secured). The computing device 110 could be programmed to ascertain or calculate the rebound times based on one or more of the direction of vehicle travel, the orientation of the passenger (i.e., rearward or forward or side facing), the direction of crash (i.e., forward impact, side impact, rear impact, angled impact, offset impact, rollover, etc.), the severity of the crash. The computing device 110 could also rely on the maximum excursions allowed within the vehicle or by legislation (i.e., is programmed to know the vehicle environment or was pre-programmed with the wheelchair compartment dimensions, etc.), visual means of seeing the position and/or change in velocity of the wheeled mobility device and occupant (i.e., camera detects forward movement into multiple zones, once the next 'zone' is not crossed this is the maximum forward excursion), or sensors (e.g., accelerometers) embedded on the vehicle, the retractors, the retractor hooks, the wheeled mobility device, the lap belt buckle, and/or the occupant that will detect the relative positions of the vehicle (e.g., by virtue of the vehicle or retractor sensors), the wheeled mobility device (e.g., by virtue of the hook sensors or the wheeled mobility device sensor), and the occupant (e.g., by virtue of the lap belt sensor or the occupant sensor).

In the eighth step 280, the computing device 110 will trigger the appropriate safety device at the appropriate time. The computing device 110 may be programmed to repeat any one or more of the first through eighth steps 210, 220, 230, 240, 250, 260, 270, 280 to address subsequent or secondary adverse driving conditions or rebounds and oscillations. In some instances, it may be desirable to activate the same safety device more than once, which can be accomplished through the use of a multi-use safety device, or multiple single-use safety devices.

Turning now to FIGS. 4-8, an exemplary implementation of an energy management system is shown to control oscillating excursions in a forward-facing, four-point tie-down securement system during a front-side impact. These figures show a wheeled mobility device 310 being secured by a left-front-side tie-down 320, a right-front-side tie-down 325, a left-rear-side tie-down 330, and a right-rear-side tie-down 335. Notably, the two front-side tie-downs 320, 325 are ideally spaced apart a distance equal to or wider than the width of the wheeled mobility device 310, whereby the straps are angled toward each other as they extend from the vehicle attachment points to the wheeled mobility device attachment points, as shown. This configuration increases the chance that the front-side straps will have a direct path from the vehicle attachment points to the wheeled mobility device attachment points, without significantly interfering with the passenger's legs or feet. In addition, the two rear-side tie downs 330, 335 are ideally spaced apart a distance equal to or narrower than the width of the wheeled mobility device 310, whereby the straps are angled away from each other as they extend from the vehicle attachment point to the wheeled mobility device attachment points, as shown. This configuration increases the chance that the rear-side straps will have a direct path from the vehicle attachment points to the wheeled mobility device attachment points, without having to pass through the rear wheels of the wheeled mobility device. While the respective angles of the tie-downs are not necessarily important for the example of a frontal impact in FIGS. 4-8, the angles may impact how the energy management system is implemented in other aggressive driving maneuvers, such as a right-side or left-side collision, or a long duration turn, as explained in more detail below with reference to FIGS. 14-18.

FIG. 4 shows the four-point tie-down securement system at T0, at the moment of a front-side accident. At about this time, the computing device 110 will ascertain that an adverse driving condition has occurred and will prepare to deploy one or more safety devices. In one embodiment, the computing device 110 may receive data indicating that the vehicle has experienced a large acceleration in the rearward direction, and will conclude that the adverse driving condition is a front-side impact. The computing device 110 will then know to trigger fast-acting tensioners for the front-side tie-downs after a first pre-determined time delay has elapsed, where the first pre-determined time delay corresponds to the rebound time for the wheeled mobility device. The computing device 110 will then know to trigger fast-acting tensioners for the rear-side tie-downs after a second pre-determined time delay has elapsed, where the second pre-determined time delay corresponds to the secondary rebound time for the wheeled mobility device.

More particularly, FIG. 5 shows the four-point tie-down securement system after the front-side collision, at about T2c, when the wheeled mobility device has completed its initial, forward excursion (i.e., approximately when the first pre-determined time delay has elapsed). As can be seen, at T2c, wheeled mobility device 310 has moved forward a distance, the rear-side tie-downs 330, 335 have stretched, and the front-side tie-downs 320, 325 have slack in the webbing. FIG. 6 shows the four-point tie-down securement system immediately after the computing device 110 has triggered the first safety device (i.e., after the first pre-determined time delay has elapsed). In FIG. 6, it can be seen that fast-acting tensioners have removed the slack from the webbing in the front-side tie-downs 320, 325, ideally prior, at or about the time the wheeled mobility device beginning its rear excursion. FIG. 7 shows the four-point tie-down securement system at about T3c, when the wheeled mobility device has completed its secondary, rear excursion (i.e., approximately when the second pre-determined time delay has elapsed). As can be seen, at T3c, the wheeled mobility device 310 has moved rearward a distance, although not as far as it otherwise would if the computing device 110 did not trigger safety devices for the front-side tie-downs 320, 325. In FIG. 7 (as compared to FIG. 6), the front-side tie-downs 320, 325 have stretched, and the rear-side tie-downs 330, 335 may have slack in the webbing. FIG. 8 shows the four-point tie-down securement system immediately after the computing device 110 has triggered the second safety device (i.e., after the second pre-determined time delay has elapsed). In FIG. 8, it can be seen that fast-acting tensioners have removed the slack from the webbing in the rear-side tie-downs 330, 335, ideally prior, at or about the time the wheeled mobility device begins its tertiary, forward excursion. Additional tensioning events may be necessary or desirable in more severe events to address additional oscillations.

While FIGS. 4-8 demonstrate how an energy management system could be implemented for a wheeled mobility device secured in a forward-facing orientation in a four-point tie-down system while experiencing a front-side collision, the concepts described above may be applied during a heavy braking event. In addition, the concepts describe above may be applied in a rear-side collision or heavy acceleration event (except that the safety devices for the rear-side tie-downs would be triggered first). Further yet, the concepts described above may be applied with a rear-facing wheeled mobility device that is experiencing a front-side or rear-side collision, a heavy braking event, or a heavy acceleration event. Even further yet, the concepts described above may be applied with a side-facing wheeled mobility device that is experiencing a right- or left-side collision, a long duration turn, or a sharp turn. Even further yet, the concepts described above may be applied in a 3-point tie-down system, where there is a single tie-down for the front-side of the wheeled mobility device.

Turning now to FIGS. 9-13, an exemplary implementation of an energy management system is shown to control oscillating excursions in a forward-facing, four-point tie-down securement system during a left-side impact. Notably, as is ideal and typical, the front-side tie-downs 320, 325 are angled toward each other as they extend from the vehicle attachment points to the wheeled mobility device attachment points, and the rear-side tie-downs 330, 335 are angled away from each other as they extend from the vehicle attachment points to the wheeled mobility device attachment points.

FIG. 9 shows the four-point tie-down securement system at T0, at the moment of a left-side accident. At about this time, the computing device 110 will ascertain that an adverse driving condition has occurred and will prepare to deploy one or more safety devices. In one embodiment, the computing device 110 may receive data indicating that the vehicle has experienced a large acceleration in the rightward direction, and will conclude that the adverse driving condition is a left-side impact. The computing device 110 will then know to trigger fast-acting tensioners for one of the front-side tie-downs and one of the rear-side tie-downs after a first pre-determined time delay has elapsed, where the first pre-determined time delay corresponds to the rebound time for the wheeled mobility device. The computing device 110 will then know to trigger fast-acting tensioners for the other ones of the front-side and rear-side tie-downs after a second pre-determined time delay has elapsed, where the second pre-determined time delay corresponds to the secondary rebound time for the wheeled mobility device.

More particularly, FIG. 10 shows the four-point tie-down securement system after the left-side collision, at about T2c, when the wheeled mobility device has completed its initial, leftward excursion (i.e., approximately when the first pre-determined time delay has elapsed). As can be seen, at T2c, wheeled mobility device 310 has moved left a distance, the right-front-side tie-down 325 and the left-rear-side tie-down 330 have stretched, and the left-front-side tie-down 320 and the right-rear-side tie-down 335 have slack in the webbing. FIG. 11 shows the four-point tie-down securement system immediately after the computing device 110 has triggered the first safety device (i.e., after the first pre-determined time delay has elapsed). In FIG. 11, it can be seen that fast-acting tensioners have removed the slack from the webbing in the left-front-side and right-rear-side tie-downs 320, 335, ideally prior, at or about the time the wheeled mobility device begins its rightward excursion. FIG. 12 shows the four-point tie-down securement system at about T3c, when the wheeled mobility device has completed its secondary, rightward excursion (i.e., approximately when the second pre-determined time delay has elapsed). As can be seen, at T3c, the wheeled mobility device 310 has moved rightward a distance, although not as far as it otherwise would if the computing device 110 did not trigger safety devices for one each of the front-side tie-downs 320, 325 and rear-side tie-downs 330, 335. In FIG. 12 (as compared to FIG. 11), the left-front-side and right-rear-side tie-downs 320, 335 have stretched, and the right-front-side and left-rear-side tie-downs 325, 330 may have slack in the webbing. FIG. 13 shows the four-point tie-down securement system immediately after the computing device 110 has triggered the second safety device (i.e., after the second pre-determined time delay has elapsed). In FIG. 13, it can be seen that fast-acting tensioners have removed the slack from the webbing in and the right-front-side and left-rear-side tie-downs 325, 330, ideally prior, at or about the time the wheeled mobility device begins its tertiary, leftward excursion. Additional tensioning events may be necessary or desirable in more severe events to address additional oscillations.

While FIGS. 9-13 demonstrate how an energy management system could be implemented for a wheeled mobility device secured in a forward-facing orientation in a four-point tie-down system while experiencing a left-side collision, the concepts described above may be applied during a right-side collision, a long duration turn, or a sharp turn event. In addition, the concepts described above may be applied with a side-facing wheeled mobility device that is experiencing a front- or rear-side collision. Even further yet, the concepts described above may be applied in a 3-point tie-down system, where there is a single tie-down for the front-side of the wheeled mobility device.

Turning now to FIGS. 14-18, an exemplary implementation of an energy management system is shown to control oscillating excursions in a forward-facing, four-point tie-down securement system during a left-side impact, when the rear-side tie-downs are installed at non-ideal angles. In particular, the rear-side tie-downs 330, 335 are angled toward each other as they extend from the vehicle attachment points to the wheeled mobility device attachment points. The computing device 110 could be programmed to receive input from external devices 160 that are indicative of the non-ideal angles, other non-ideal securement conditions, and to adapt the computing device's 110 response to an adverse driving condition based on that input. For instance, with the rear-side tie-downs attached to the wheeled mobility device at a non-ideal angle (angled toward each other), the computing device 110 will understand that the left-front-side and left-rear-side tie-downs 320, 330 will experience webbing slack during the initial leftward excursion (see FIG. 15, as compared to FIG. 10 with ideal angles) and will trigger safety devices for the two left-side tie-downs at about T2c (see FIG. 16). In addition, the computing device 110 will understand that the right-front-side and right-rear-side tie-downs 325, 335 will experience webbing slack during the secondary rightward excursion (see FIG. 17, as compared to FIG. 12 with ideal angles) and will trigger safety devices for the two right-side tie-downs at about T3c (see FIG. 18).

In other embodiments, including those that may involve a more complex accident, e.g., spins and rollovers, the computing device 110 can rely upon sensors or other systems that detect the amount of tension in each tie-down and/or whether a tie-down is experiencing slack, and to trigger fast-acting tensioners for the tie-downs that are experiencing slack, possibly multiple times to address oscillations.

Turning now to FIGS. 19-23, an exemplary implementation of an energy management system is shown to control oscillating excursions in a forward-facing, three-point tie-down and bumper securement system during a front-side impact. These figures show a wheeled mobility device 310 being secured by a left-front-side tie-down 320, a left-rear-side tie-down 330, a right-rear-side tie-down 335, and a bumper 340 located on the left side of the wheeled mobility device. The bumper 340 may be stationary, may be moveable between a retracted and extended position (where by bumper will be close to, touching, or pushing the wheeled mobility device), or may be biased outward using springs or the like.

FIG. 19 shows the securement system at T0, at the moment of a front-side accident. At about this time, the computing device 110 will ascertain that an adverse driving condition has occurred and will prepare to deploy one or more safety devices. In one embodiment, the computing device 110 may receive data indicating that the vehicle has experienced a large acceleration in the rearward direction, and will conclude that the adverse driving condition is a front-side impact. The computing device 110 will then know to trigger a fast-acting tensioner for the front-side tie-down after a first pre-determined time delay has elapsed, where the first pre-determined time delay corresponds to the rebound time for the wheeled mobility device. The computing device 110 will then know to trigger fast-acting tensioners for the rear-side tie-downs after a second pre-determined time delay has elapsed, where the second pre-determined time delay corresponds to the secondary rebound time for the wheeled mobility device.

More particularly, FIG. 20 shows the three-point tie-down securement system after the front-side collision, at about T2c, when the wheeled mobility device has completed its initial, forward excursion (i.e., approximately when the first pre-determined time delay has elapsed). As can be seen, at T2c, wheeled mobility device 310 has moved forward a distance, the rear-side tie-downs 330, 335 have stretched, and the front-side tie-down 320 has slack in the webbing. FIG. 21 shows the three-point tie-down securement system immediately after the computing device 110 has triggered the first safety device (i.e., after the first pre-determined time delay has elapsed). In FIG. 21, it can be seen that fast-acting tensioner has removed the slack from the webbing in the front-side tie-down 320, ideally prior, at or about the time the wheeled mobility device begins its rear excursion. FIG. 22 shows the three-point tie-down securement system at about T3c, when the wheeled mobility device has completed its secondary, rear excursion (i.e., approximately when the second pre-determined time delay has elapsed). As can be seen, at T3c, the wheeled mobility device 310 has moved rearward a distance, although not as far as it otherwise would if the computing device 110 did not trigger a safety device for the front-side tie-down 320. In FIG. 22 (as compared to FIG. 21), the front-side tie-down 320 has stretched, and the rear-side tie-downs 330, 335 may have slack in the webbing. FIG. 23 shows the three-point tie-down securement system immediately after the computing device 110 has triggered the second safety device (i.e., after the second pre-determined time delay has elapsed). In FIG. 23, it can be seen that fast-acting tensioners have removed the slack from the webbing in the rear-side tie-downs 330, 335, ideally prior, at or about the time the wheeled mobility device begins its tertiary, forward excursion.

While FIGS. 19-23 demonstrate how an energy management system could be implemented for a wheeled mobility device secured in a forward-facing orientation in a three-point tie-down system while experiencing a front-side collision, the concepts described above may be applied during a heavy braking event. In addition, the concepts describe above may be applied in a rear-side collision or heavy acceleration event (except that the safety devices for the rear-side tie-downs would be triggered first). Further yet, the concepts described above may be applied with a rear-facing wheeled mobility device that is experiencing a front-side or rear-side collision, a heavy braking event, or a heavy acceleration event (since the two tie-downs would always be disposed toward the rear of the vehicle, for added strength in front-side collisions). Even further yet, the concepts described above may be applied with a side-facing wheeled mobility device that is experiencing a right-side or left-side collision, or a long duration or sharp turn. Additional tensioning events may be necessary or desirable in more severe events to address additional oscillations.

Turning now to FIGS. 24-28, an exemplary implementation of an energy management system is shown to control oscillating excursions in a forward-facing, three-point tie-down and bumper securement system during a left-side impact. The bumper 340 as shown is moveable both left and right in the event of an adverse driving condition, but may be stationary or biased using springs or the like.

FIG. 24 shows the three-point tie-down securement system at T0, at the moment of a left-side accident. As shown, the wheeled mobility device is spaced from the bumper 340, but it could be touching, exerting pressure on, or compressing the bumper 340. At about this time, the computing device 110 will ascertain that an adverse driving condition has occurred and will prepare to deploy one or more safety devices. In one embodiment, the computing device 110 may receive data indicating that the vehicle has experienced a large acceleration in the rightward direction, and will conclude that the adverse driving condition is a left-side impact. The computing device 110 will then know to trigger fast-acting tensioners for the left-front-side tie-down and one of the rear-side tie-downs after a first pre-determined time delay has elapsed, where the first pre-determined time delay corresponds to the rebound time for the wheeled mobility device. The computing device 110 will then know to trigger a fast-acting tensioner for the other rear-side tie-down and a fast-acting safety device for moving the bumper 340 toward the wheeled mobility device after a second pre-determined time delay has elapsed, where the second pre-determined time delay corresponds to the secondary rebound time for the wheeled mobility device.

More particularly, FIG. 25 shows the three-point tie-down securement system after the left-side collision, at about T2c, when the wheeled mobility device has completed its initial, leftward excursion (i.e., approximately when the first pre-determined time delay has elapsed). At this point, the wheeled mobility device may still be spaced from, or touching (as shown), exerting pressure on, or compressing the bumper 340. As can be seen, at T2c, wheeled mobility device 310 has moved left a distance, the left-rear-side tie-down 330 has stretched, and the left-front-side tie-down 320 and the right-rear-side tie-down 335 have slack in the webbing. FIG. 26 shows the three-point tie-down securement system immediately after the computing device 110 has triggered the first safety device (i.e., after the first pre-determined time delay has elapsed). In FIG. 26, it can be seen that fast-acting tensioners have removed the slack from the webbing in the left-front-side and right-rear-side tie-downs 320, 335, ideally prior, at or about the time the wheeled mobility device begins its rightward excursion. FIG. 27 shows the three-point tie-down securement system at about T3c, when the wheeled mobility device has completed its secondary, rightward excursion (i.e., approximately when the second pre-determined time delay has elapsed). As can be seen, at T3c, the wheeled mobility device 310 has moved rightward a distance, although not as far as it otherwise would if the computing device 110 did not trigger safety devices for the left-front-side and right-rear-side tie-downs 320, 335. In FIG. 27 (as compared to FIG. 26), the left-front-side and right-rear-side tie-downs 320, 335 have stretched, there is slack in the strap of the left-rear-side tie down 330, and the wheeled mobility device 310 has moved away from the bumper 340, where there is a space between the two, and a fast-acting tensioner has removed slack from the strap of the left-rear-side tie-down 330. FIG. 28 shows the three-point tie-down securement system immediately after the computing device 110 has triggered the second safety device (i.e., after the second pre-determined time delay has elapsed). In FIG. 27, it can be seen that the safety device (such as an airbag, or fast-acting movement mechanism, or other movement devices) has moved the bumper 340 rightward toward the wheeled mobility device to eliminate (as shown) or lessen the space between the two. The computing device 110 moves the bumper 340 toward the wheeled mobility device and removes slack from the strap of the left-rear-side tie-down 330 ideally prior, at or about the time the wheeled mobility device begins its tertiary, leftward excursion. Additional bumper movement and tensioning events may be necessary or desirable in more severe events to address additional oscillations.

While FIGS. 24-28 demonstrate how an energy management system could be implemented for a wheeled mobility device secured in a forward-facing orientation in a three-point tie-down system while experiencing a left-side collision, the concepts described above may be applied during a right-side collision, a long duration turn, or a sharp turn event. In addition, the concepts described above may be applied with a side-facing wheeled mobility device that is experiencing a front- or rear-side collision. Even further yet, the concepts described above for the moveable bumper 340 may be applied to the use of a bumper in a four-point system or for a compression-based bumper system, like the Q'Straint Quantum.

Turning now to FIGS. 29-33, an exemplary implementation of an energy management system is shown to control oscillating excursions in a forward-facing, two-point tie-down and bumper securement system during a front-side impact, with the tie-downs and bumper located at the rear of the wheeled mobility device. These figures show a wheeled mobility device 310 being secured by a left-rear-side tie-down 330, a right-rear-side tie-down 335, and a bumper 340 located at the rear side of the wheeled mobility device. The bumper 340 may be stationary, may be moveable between a retracted and extended position (where by bumper will be close to, touching, or pushing the wheeled mobility device), or may be biased outward using springs or the like.

FIG. 29 shows the securement system at T0, at the moment of a front-side accident. At about this time, the computing device 110 will ascertain that an adverse driving condition has occurred and will prepare to deploy one or more safety devices. In one embodiment, the computing device 110 may receive data indicating that the vehicle has experienced a large acceleration in the rearward direction, and will conclude that the adverse driving condition is a front-side impact. The computing device 110 will then know to trigger a fast-acting device for moving the bumper 340 after a first pre-determined time delay has elapsed, where the first pre-determined time delay corresponds to the rebound time for the wheeled mobility device. The computing device 110 will then know to trigger fast-acting tensioners for the rear-side tie-downs after a second pre-determined time delay has elapsed, where the second pre-determined time delay corresponds to the secondary rebound time for the wheeled mobility device.

More particularly, FIG. 30 shows the two-point tie-down securement system after the front-side collision, at about T2c, when the wheeled mobility device has completed its initial, forward excursion (i.e., approximately when the first pre-determined time delay has elapsed). As can be seen, at T2c, wheeled mobility device 310 has moved forward a distance, the rear-side tie-downs 330, 335 have stretched, and a space or gap has formed between the bumper 340 and the wheeled mobility device 310. FIG. 31 shows the two-point tie-down securement system immediately after the computing device 110 has triggered the first safety device (i.e., after the first pre-determined time delay has elapsed). In FIG. 31, it can be seen that fast-acting movement device (such as an airbag or fast-acting mechanism) has moved the bumper 340 forward into contact with the back of the wheeled mobility device 310, ideally prior, at or about the time the wheeled mobility device begins its rear excursion. FIG. 32 shows the two-point tie-down securement system at about T3c, when the wheeled mobility device has completed its secondary, rear excursion (i.e., approximately when the second pre-determined time delay has elapsed). As can be seen, at T3c, the wheeled mobility device 310 has moved rearward a distance (compressing or pushing the bumper 340 rearward), although not as far as it otherwise would if the computing device 110 did not trigger a safety device for the bumper 340. In FIG. 32 (as compared to FIG. 31), the rear-side tie-downs 330, 335 may have slack in the webbing. FIG. 33 shows the two-point tie-down securement system immediately after the computing device 110 has triggered the second safety device (i.e., after the second pre-determined time delay has elapsed). In FIG. 33, it can be seen that fast-acting tensioners have removed the slack from the webbing in the rear-side tie-downs 330, 335, ideally prior, at or about the time the wheeled mobility device begins its tertiary, forward excursion. Additional bumper movement and tensioning events may be necessary or desirable in more severe vents to address additional oscillations.

While FIGS. 29-33 demonstrate how an energy management system could be implemented for a wheeled mobility device secured in a forward-facing orientation in a two-point tie-down system while experiencing a front-side collision, the concepts described above may be applied during a heavy braking event. In addition, the concepts describe above may be applied in a rear-side collision or heavy acceleration event (except that the safety devices for the rear-side tie-downs would be triggered first). Further yet, the concepts described above may be applied with a rear-facing wheeled mobility device that is experiencing a front-side or rear-side collision, a heavy braking event, or a heavy acceleration event. Even further yet, the concepts described above may be applied with a side-facing wheeled mobility device that is experiencing a right-side or left-side collision, or a long duration or sharp turn. Even further yet, the concepts described above for the moveable bumper 340 may be applied to the use of a bumper in a four-point system or for a compression-based bumper system, like the Q'Straint Quantum.

Turning now to FIGS. 34-38, an exemplary implementation of an energy management system is shown to control oscillating excursions in a forward-facing, two-point tie-down and bumper securement system during a left-side impact, with the tie-downs and bumper located at the rear of the wheeled mobility device.

FIG. 34 shows the two-point tie-down securement system at T0, at the moment of a left-side accident. At about this time, the computing device 110 will ascertain that an adverse driving condition has occurred and will prepare to deploy one or more safety devices. In one embodiment, the computing device 110 may receive data indicating that the vehicle has experienced a large acceleration in the rightward direction, and will conclude that the adverse driving condition is a left-side impact. The computing device 110 will then know to trigger fast-acting tensioners for one of the rear-side tie-downs after a first pre-determined time delay has elapsed, where the first pre-determined time delay corresponds to the rebound time for the wheeled mobility device. The computing device 110 will then know to trigger a fast-acting tensioner for the other rear-side tie-down after a second pre-determined time delay has elapsed, where the second pre-determined time delay corresponds to the secondary rebound time for the wheeled mobility device.

More particularly, FIG. 35 shows the two-point tie-down securement system after the left-side collision, at about T2*c*, when the wheeled mobility device has completed its initial, leftward excursion (i.e., approximately when the first pre-determined time delay has elapsed). As can be seen, at T2*c*, wheeled mobility device 310 has moved left a distance, the left-rear-side tie-down 330 has stretched, and the right-rear-side tie-down 335 has slack in the webbing. FIG. 36 shows the two-point tie-down securement system immediately after the computing device 110 has triggered the first safety device (i.e., after the first pre-determined time delay has elapsed). In FIG. 36, it can be seen that a fast-acting tensioner has removed the slack from the webbing in right-rear-side tie-down 335, ideally prior, at or about the time the wheeled mobility device begins its rightward excursion. FIG. 37 shows the two-point tie-down securement system at about T3*c*, when the wheeled mobility device has completed its secondary, rightward excursion (i.e., approximately when the second pre-determined time delay has elapsed). As can be seen, at T3*c*, the wheeled mobility device 310 has moved rightward a distance, although not as far as it otherwise would if the computing device 110 did not trigger the safety device for the right-rear-side tie-down 335. In FIG. 37 (as compared to FIG. 36), the right-rear-side tie-down 335 has stretched and slack has been introduced into the left-rear-side tie-down 330. FIG. 38 shows the three-point tie-down securement system immediately after the computing device 110 has triggered the second safety device (i.e., after the second pre-determined time delay has elapsed). In FIG. 37, it can be seen that a fast-acting tensioner has removed the slack from the webbing in the left-rear-side tie-down 330, ideally prior, at or about the time the wheeled mobility device begins its tertiary, leftward excursion. Additional tensioning events may be necessary or desirable in more severe vents to address additional oscillations.

While FIGS. 34-38 demonstrate how an energy management system could be implemented for a wheeled mobility device secured in a forward-facing orientation in a two-point tie-down system while experiencing a left-side collision, the concepts described above may be applied during a right-side collision, a long duration turn, or a sharp turn event. In addition, the concepts described above may be applied with a side-facing wheeled mobility device that is experiencing a front- or rear-side collision.

Turning now to FIGS. 39-43, an exemplary implementation of an energy management system is shown to control oscillating excursions in a forward-facing, two-point tie-down and bumper securement system during a front-side impact, with the tie-downs and bumper located at the left side of the wheeled mobility device. These figures show a wheeled mobility device 310 being secured by a left-front-side tie-down 320, a left-rear-side tie-down 330, and a bumper 340 located at the left side of the wheeled mobility device. The bumper 340 may be stationary, may be moveable between a retracted and extended position (where by bumper will be close to, touching, or pushing the wheeled mobility device), or may be biased outward using springs or the like.

FIG. 39 shows the securement system at T0, at the moment of a front-side accident. At about this time, the computing device 110 will ascertain that an adverse driving condition has occurred and will prepare to deploy one or more safety devices. In one embodiment, the computing device 110 may receive data indicating that the vehicle has experienced a large acceleration in the rearward direction, and will conclude that the adverse driving condition is a front-side impact. The computing device 110 will then know to trigger a fast-acting tensioner for the front-left-side tie-down 320 after a first pre-determined time delay has elapsed, where the first pre-determined time delay corresponds to the rebound time for the wheeled mobility device. The computing device 110 will then know to trigger fast-acting tensioners for the left-rear-side tie-down 330 after a second pre-determined time delay has elapsed, where the second pre-determined time delay corresponds to the secondary rebound time for the wheeled mobility device.

More particularly, FIG. 40 shows the two-point tie-down securement system after the front-side collision, at about T2*c*, when the wheeled mobility device has completed its initial, forward excursion (i.e., approximately when the first pre-determined time delay has elapsed). As can be seen, at T2*c*, wheeled mobility device 310 has moved forward a distance, the left-rear-side tie-down 330 has stretched, and slack has formed in the webbing of the front-left-side tie-down 320. FIG. 41 shows the two-point tie-down securement system immediately after the computing device 110 has triggered the first safety device (i.e., after the first pre-determined time delay has elapsed). In FIG. 41, it can be seen that a fast-acting tensioner has removed the slack from the webbing of the front-left-side tie-down 320, ideally prior, at or about the time the wheeled mobility device begins its rear excursion. FIG. 42 shows the two-point tie-down securement system at about T3*c*, when the wheeled mobility device has completed its secondary, rear excursion (i.e., approximately when the second pre-determined time delay has elapsed). As can be seen, at T3*c*, the wheeled mobility device 310 has moved rearward a distance, although not as far as it otherwise would if the computing device 110 did not trigger a safety device for the front-left-side tie-down 320. In FIG. 42 (as compared to FIG. 41), the left-rear-side tie-downs 330 may have slack in the webbing. FIG. 43 shows the two-point tie-down securement system immediately after the computing device 110 has triggered the second safety device (i.e., after the second pre-determined time delay has elapsed). In FIG. 43, it can be seen that fast-acting tensioners have removed the slack from the webbing in the left-rear-side tie-down 330, ideally prior, at or about the time the wheeled mobility device begins its tertiary, forward excursion. Additional tensioning events may be necessary or desirable in more severe vents to address additional oscillations.

While FIGS. 39-43 demonstrate how an energy management system could be implemented for a wheeled mobility device secured in a forward-facing orientation in a two-point tie-down system while experiencing a front-side collision, the concepts described above may be applied during a heavy braking event. In addition, the concepts describe above may be applied in a rear-side collision or heavy acceleration event (except that the safety devices for the rear-side tie-downs would be triggered first). Further yet, the concepts described above may be applied with a rear-facing wheeled mobility device that is experiencing a front-side or rear-side collision, a heavy braking event, or a heavy acceleration event. Even further yet, the concepts described above may be applied with a side-facing wheeled mobility device that is experiencing a right-side or left-side collision, or a long duration or sharp turn.

Turning now to FIGS. 44-48, an exemplary implementation of an energy management system is shown to control oscillating excursions in a forward-facing, two-point tie-down and bumper securement system during a left-side impact, with the tie-downs and bumper located at the left side of the wheeled mobility device. The bumper 340 as shown is moveable both left and right in the event of an adverse driving condition, but may be stationary or biased using springs or the like.

FIG. 44 shows the two-point tie-down securement system at T0, at the moment of a left-side accident. As shown, the wheeled mobility device is touching the bumper 340, but it could be spaced the bumper 340. At about this time, the computing device 110 will ascertain that an adverse driving condition has occurred and will prepare to deploy one or more safety devices. In one embodiment, the computing device 110 may receive data indicating that the vehicle has experienced a large acceleration in the rightward direction, and will conclude that the adverse driving condition is a left-side impact. The computing device 110 will then know to trigger a fast-acting tensioner for the front-left-side tie-down after a first pre-determined time delay has elapsed, where the first pre-determined time delay corresponds to the rebound time for the wheeled mobility device. The computing device 110 will then know to trigger a fast-acting tensioner for the right-rear-side tie-down and a fast-acting safety device for moving the bumper 340 toward the wheeled mobility device after a second pre-determined time delay has elapsed, where the second pre-determined time delay corresponds to the secondary rebound time for the wheeled mobility device.

More particularly, FIG. 45 shows the two-point tie-down securement system after the left-side collision, at about T2*c*, when the wheeled mobility device has completed its initial, leftward excursion (i.e., approximately when the first pre-determined time delay has elapsed). At this point, the wheeled mobility device has compressed the bumper 340, although depending on the severity of the accident, it may be spaced from or just touching the bumper 340. As can be seen, at T2*c*, wheeled mobility device 310 has moved left a distance, the left-rear-side tie-down 330 has stretched, and the left-front-side tie-down 320 has slack in the webbing. FIG. 46 shows the two-point tie-down securement system immediately after the computing device 110 has triggered the first safety device (i.e., after the first pre-determined time delay has elapsed). In FIG. 46, it can be seen that fast-acting tensioners have removed the slack from the webbing in the left-front-side tie-downs 320, ideally prior, at or about the time the wheeled mobility device begins its rightward excursion. FIG. 47 shows the two-point tie-down securement system at about T3*c*, when the wheeled mobility device has completed its secondary, rightward excursion (i.e., approximately when the second pre-determined time delay has elapsed). As can be seen, at T3*c*, the wheeled mobility device 310 has moved rightward a distance, although not as far as it otherwise would if the computing device 110 did not trigger a safety device for the left-front-side tie-downs 320. In FIG. 47 (as compared to FIG. 46), the left-front-side tie-down 320 has stretched, the left-rear-side tie-down 330 has slack in the strap, and the wheeled mobility device 310 has moved away from the bumper 340, where there is a space between the two. FIG. 48 shows the two-point tie-down securement system immediately after the computing device 110 has triggered the second safety device (i.e., after the second pre-determined time delay has elapsed). In FIG. 47, it can be seen that the safety device (such as an airbag, or fast-acting movement mechanism, or other movement devices) has moved the bumper 340 rightward toward the wheeled mobility device to eliminate (as shown) or lessen the space between the two, and a fast-acting tensioner has removed slack in the strap of the left-rear-side tie-down 330. The computing device 110 moves the bumper 340 toward the wheeled mobility device and the fast-acting tensioner has removed the slack ideally prior, at or about the time the wheeled mobility device begins its tertiary, leftward excursion. Additional bumper movement and tensioning events may be necessary or desirable in more severe vents to address additional oscillations.

While FIGS. 44-48 demonstrate how an energy management system could be implemented for a wheeled mobility device secured in a forward-facing orientation in a two-point tie-down system while experiencing a left-side collision, the concepts described above may be applied during a right-side collision, a long duration turn, or a sharp turn event. In addition, the concepts described above may be applied with a side-facing wheeled mobility device that is experiencing a front- or rear-side collision. Even further yet, the concepts described above for the moveable bumper 340 may be applied to the use of a bumper in a four-point system or for a compression-based bumper system, like the Q'Straint Quantum.

Turning now to FIGS. 49-53, an exemplary implementation of an energy management system is shown to control oscillating excursions in a forward-facing, two-point tie-down and bumper securement system during a front-side impact, with the tie-downs located at opposite corners and the bumper located at the left side of the wheeled mobility device. These figures show a wheeled mobility device 310 being secured by a right-front-side tie-down 325, a left-rear-side tie-down 330, and a bumper 340 located at the left side of the wheeled mobility device. The bumper 340 may be stationary, may be moveable between a retracted and extended position (where by bumper will be close to, touching, or pushing the wheeled mobility device), or may be biased outward using springs or the like.

FIG. 49 shows the securement system at T0, at the moment of a front-side accident. At about this time, the computing device 110 will ascertain that an adverse driving condition has occurred and will prepare to deploy one or more safety devices. In one embodiment, the computing device 110 may receive data indicating that the vehicle has experienced a large acceleration in the rearward direction, and will conclude that the adverse driving condition is a front-side impact. The computing device 110 will then know to trigger a fast-acting tensioner for the right-front-side tie-down 325 after a first pre-determined time delay has elapsed, where the first pre-determined time delay corresponds to the rebound time for the wheeled mobility device. The computing device 110 will then know to trigger a fast-acting tensioner for the left-rear-side tie-down 330 after a second pre-determined time delay has elapsed, where the second pre-determined time delay corresponds to the secondary rebound time for the wheeled mobility device.

More particularly, FIG. 50 shows the two-point tie-down securement system after the front-side collision, at about T2c, when the wheeled mobility device has completed its initial, forward excursion (i.e., approximately when the first pre-determined time delay has elapsed). As can be seen, at T2c, wheeled mobility device 310 has moved forward a distance, the left-rear-side tie-down 330 has stretched, and slack has formed in the webbing of the right-front-side tie-down 325. FIG. 51 shows the two-point tie-down securement system immediately after the computing device 110 has triggered the first safety device (i.e., after the first pre-determined time delay has elapsed). In FIG. 51, it can be seen that a fast-acting tensioner has removed the slack from the webbing of the right-front-side tie-down 325, ideally prior, at or about the time the wheeled mobility device begins its rear excursion. FIG. 52 shows the two-point tie-down securement system at about T3c, when the wheeled mobility device has completed its secondary, rear excursion (i.e., approximately when the second pre-determined time delay has elapsed). As can be seen, at T3c, the wheeled mobility device 310 has moved rearward a distance, although not as far as it otherwise would if the computing device 110 did not trigger a safety device for the right-front-side tie-down 325. In FIG. 52 (as compared to FIG. 51), the left-rear-side tie-down 330 may have slack in the webbing. FIG. 53 shows the two-point tie-down securement system immediately after the computing device 110 has triggered the second safety device (i.e., after the second pre-determined time delay has elapsed). In FIG. 53, it can be seen that a fast-acting tensioner has removed the slack from the webbing in the left-rear-side tie-down 330, ideally prior, at or about the time the wheeled mobility device begins its tertiary, forward excursion. Additional tensioning events may be necessary or desirable in more severe vents to address additional oscillations.

While FIGS. 49-53 demonstrate how an energy management system could be implemented for a wheeled mobility device secured in a forward-facing orientation in a two-point tie-down system while experiencing a front-side collision, the concepts described above may be applied during a heavy braking event. In addition, the concepts describe above may be applied in a rear-side collision or heavy acceleration event (except that the safety devices for the rear-side tie-downs would be triggered first). Further yet, the concepts described above may be applied with a rear-facing wheeled mobility device that is experiencing a front-side or rear-side collision, a heavy braking event, or a heavy acceleration event. Even further yet, the concepts described above may be applied with a side-facing wheeled mobility device that is experiencing a right-side or left-side collision, or a long duration or sharp turn.

Turning now to FIGS. 54-58, an exemplary implementation of an energy management system is shown to control oscillating excursions in a forward-facing, two-point tie-down and bumper securement system during a left-side impact, with the tie-downs located at opposite corners and bumper located at the left side of the wheeled mobility device. The bumper 340 as shown is moveable both left and right in the event of an adverse driving condition, but may be stationary or biased using springs or the like.

FIG. 54 shows the two-point tie-down securement system at T0, at the moment of a left-side accident. As shown, the wheeled mobility device is touching the bumper 340, but it could be spaced the bumper 340. At about this time, the computing device 110 will ascertain that an adverse driving condition has occurred and will prepare to deploy one or more safety devices. In one embodiment, the computing device 110 may receive data indicating that the vehicle has experienced a large acceleration in the rightward direction, and will conclude that the adverse driving condition is a left-side impact. The computing device 110 will then know to trigger a fast-acting tensioner for the left-rear-side tie-down after a first pre-determined time delay has elapsed, where the first pre-determined time delay corresponds to the rebound time for the wheeled mobility device. The computing device 110 will then know to trigger a fast-acting tensioner for the right-front-side tie-down and a fast-acting safety device for moving the bumper 340 toward the wheeled mobility device after a second pre-determined time delay has elapsed, where the second pre-determined time delay corresponds to the secondary rebound time for the wheeled mobility device.

More particularly, FIG. 55 shows the two-point tie-down securement system after the left-side collision, at about T2c, when the wheeled mobility device has completed its initial, leftward excursion (i.e., approximately when the first pre-determined time delay has elapsed). At this point, the wheeled mobility device has compressed the bumper 340, although depending on the severity of the accident, it may be spaced from or just touching the bumper 340. As can be seen, at T2c, wheeled mobility device 310 has moved left a distance and the left-rear-side tie-down 330 has slack in the webbing. FIG. 56 shows the two-point tie-down securement system immediately after the computing device 110 has triggered the first safety device (i.e., after the first pre-determined time delay has elapsed). In FIG. 46, it can be seen that fast-acting tensioners have removed the slack from the webbing in the left-rear-side tie-downs 330, ideally prior, at or about the time the wheeled mobility device begins its rightward excursion. FIG. 57 shows the two-point tie-down securement system at about T3c, when the wheeled mobility device has completed its secondary, rightward excursion (i.e., approximately when the second pre-determined time delay has elapsed). As can be seen, at T3c, the wheeled mobility device 310 has moved rightward a distance, although not as far as it otherwise would if the computing device 110 did not trigger a safety device for the left-rear-side tie-down 330. In FIG. 57 (as compared to FIG. 56), the left-rear-side tie-down 330 has stretched, the right-front-side tie-down 325 has slack in the webbing, and the wheeled mobility device 310 has moved away from the bumper 340, where there is a space between the two. FIG. 58 shows the two-point tie-down securement system immediately after the computing device 110 has triggered the second safety device (i.e., after the second pre-determined time delay has elapsed). In FIG. 57, it can be seen that a fast-acting tensioner has removed the slack from the webbing in the right-front-side tie-down 325 and the safety device (such as an airbag, or fast-acting movement mechanism, or other movement devices) has moved the bumper 340 rightward toward the wheeled mobility device to eliminate (as shown) or lessen the space between the two. The computing device 110 removes the webbing slack and moves the bumper 340 toward the wheeled mobility device ideally prior, at or about the time the wheeled mobility device begins its tertiary, leftward excursion. Additional bumper movements and tensioning events may be necessary or desirable in more severe vents to address additional oscillations.

While FIGS. 54-58 demonstrate how an energy management system could be implemented for a wheeled mobility device secured in a forward-facing orientation in a two-point tie-down system while experiencing a left-side collision, the concepts described above may be applied during a right-side collision, a long duration turn, or a sharp turn event. In addition, the concepts described above may be applied with a side-facing wheeled mobility device that is experiencing a front- or rear-side collision. Even further yet, the concepts described above for the moveable bumper 340 may be applied to the use of a bumper in a four-point system or for a compression-based bumper system, like the Q'Straint Quantum.

Turning now to FIGS. 59-62, an exemplary implementation of an energy management system is shown to control oscillating excursions in a forward-facing, compression-based securement system during a front-side impact. These figures show a wheeled mobility device 310 being secured by a left-side bumper 350, a right-side bumper 360, and a rear-side bumper 370, securing the left, right, and rear side of the wheeled mobility device 310, respectively. Any one or more of the bumpers may be stationary or may be biased outward (toward the wheeled mobility device 310) using springs or the like, although in this example the bumpers 350, 360, 370 are each moveable between a retracted and extended position (whereby the respective bumper will be close to, touching, or exerting pressure on/pushing the wheeled mobility device). The left-side and right-side bumpers 350, 360 are designed to squeeze the wheeled mobility device 310 to prevent unwanted movement during transit. It is obviously desirable to keep the squeezing pressure relatively low during normal transit conditions to avoid damaging the wheeled mobility device. However, because the safety of the passenger is of utmost importance, the bumpers 350, 360, 370 can each be provided with safety devices that cause the bumpers to quickly exert large squeezing and/or downward forces on the wheeled mobility device 310 in the event of an adverse driving condition.

Moreover, the left-side and right-side bumpers 350, 360 may optionally include secondary gripping members 355, 365 that are configured to pivot about pivot points 352, 362 from a retracted position (FIG. 59) to an extended position (FIG. 60), whereby the secondary gripping members 355, 365 will be positioned to engage with a forward facing surface or structure of the wheeled mobility device 310, such as the front surface of a wheel. As discussed in more detail below, the secondary gripping members 355, 365 serve as a secondary safety device that can be deployed in the event of an adverse driving condition.

Figure 81:
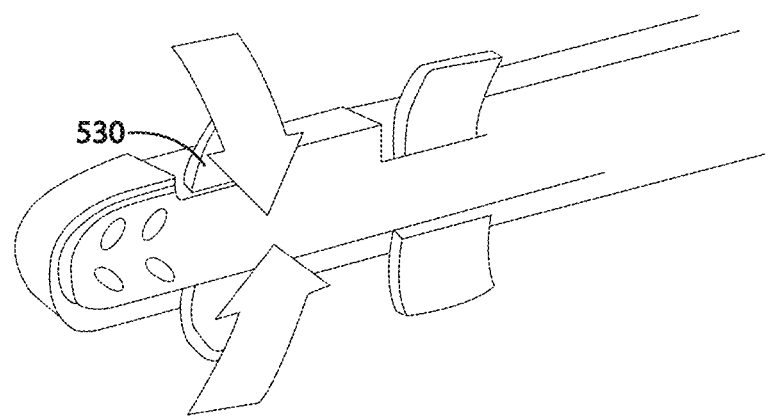
FIG. 81 depicts a bumper having a safety device in the form of extremities that can engage with the contour of the wheeled mobility device.
Figure 82:
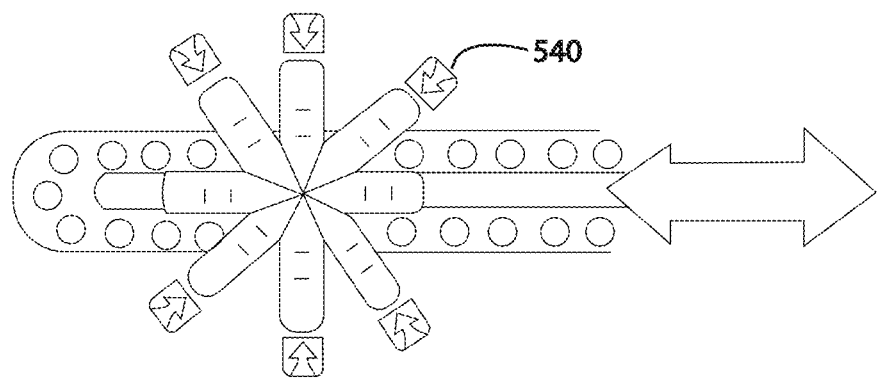
FIG. 82 depicts a bumper having a gripping member that can grip a structure on the wheeled mobility device.
Figure 83:
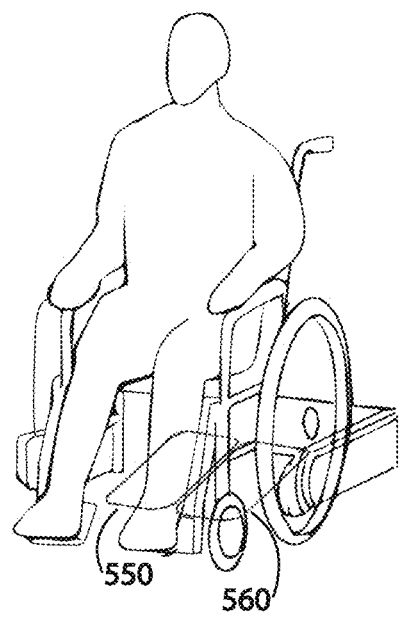
FIGS. 83-84 depict bumpers that are moveable from a stored position flush in the floor of the vehicle to an engaged position where the bumper engages with inward facing structures on the wheeled mobility device; and, FIGS. 85-97 depict various embodiments of airbags for controlling excursions of the wheeled mobility device and passenger.
Figure 84:
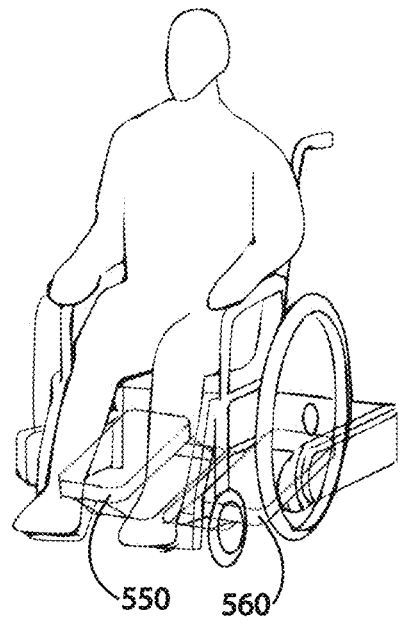
Figure 85:
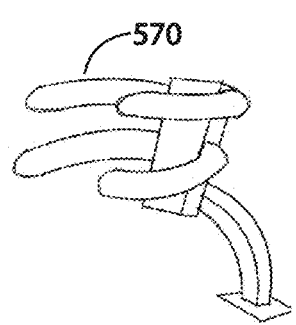
Figure 86:
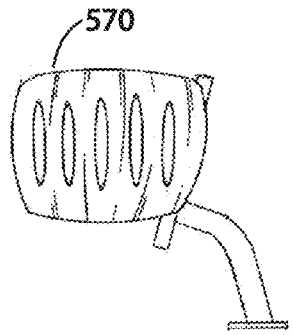
Figure 87:
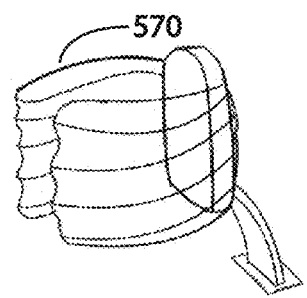
Figure 88:
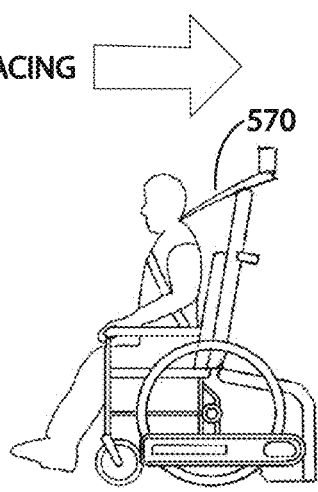
Figure 89:
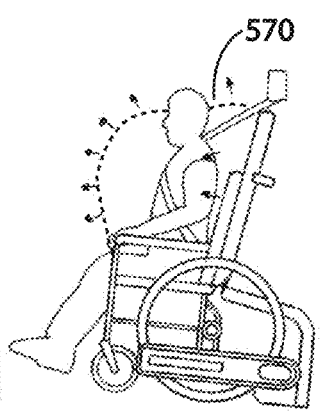
Figure 90:
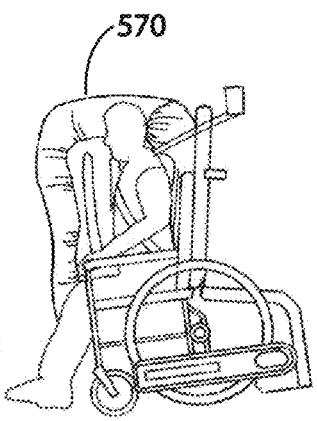
Figure 91:
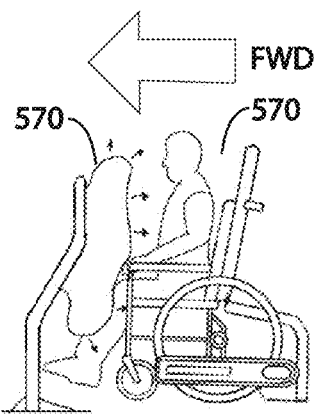
Figure 92:
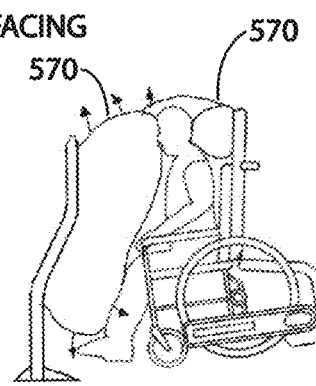
Figure 93:
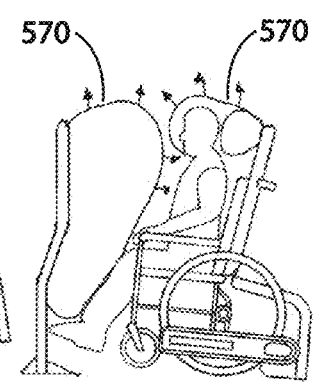
Figure 94:
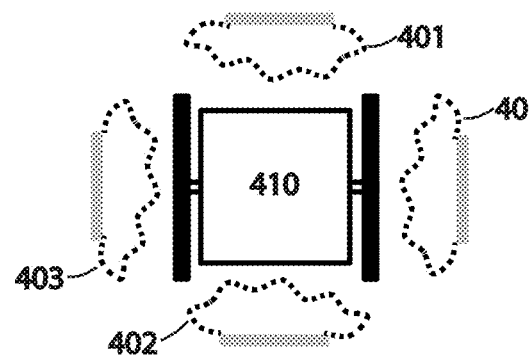

Other secondary safety devices can optionally be used in the alternative or in combination with the secondary gripping members 355, 365, including but not limited to those disclosed in U.S. Provisional Patent Application No. 62/825, 325, filed on Mar. 28, 2019, such as: pressure bladders 510 built into one or more of the bumpers 350, 360, 370 that are capable of quickly inflating through pneumatics, hydraulics, pyrotechnics, compressed gas containers, or other motive forces to enhance the engagement between contours on the engaging faces of the bumpers with various details on the wheeled mobility device 310 (see FIGS. 77-78); magneto-rheological fluid-filled bladders 520 built into one or more of the bumpers 350, 360, 370 that can be energized to create a rigid topography that interlocks with details on the wheeled mobility device 310 surfaces (see FIGS. 79-80); various contours, knobs, paddles, fingers, grippers, contour-conforming members, or other extremities 530 that can be quickly deployed to interlock with details on the wheeled mobility device 310 surfaces (see FIG. 81); an engaging member 540 that is configured to quickly grab a portion of the wheeled mobility device, such as the wheel hub (see FIG. 82); a second set of gripping members or bumpers 550, 560 that are, for example, hidden in the floor and configured to deploy and make firm contact with inner-facing surfaces of the wheeled mobility device, such as the inner surfaces of the wheels (see FIGS. 83-84); one or a plurality of airbags 570 installed in the bumpers, the wheeled mobility device, or other structures of the wheeled mobility device securement system or the vehicle (see FIGS. 85-97). Notably, any embodiment, including the tie-down systems described above, could embody and trigger any one or more of these secondary safety devices at an appropriate phase of an adverse driving condition.

Figure 59:
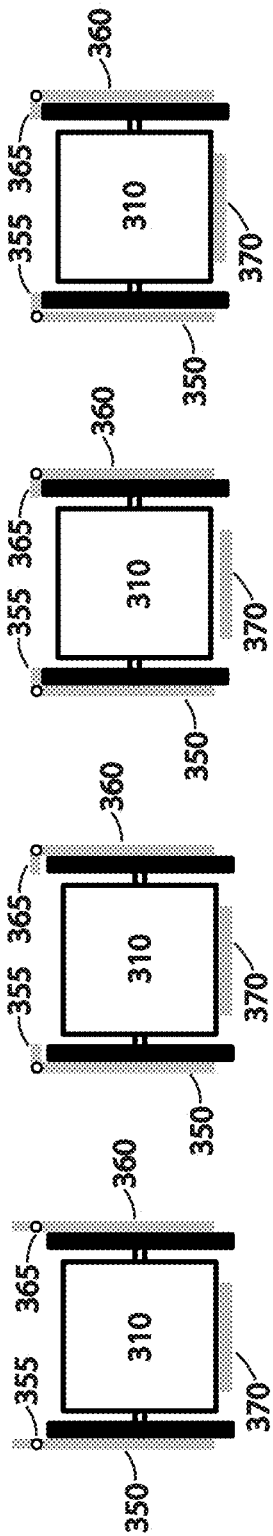
FIGS. 59-62 are a collection of schematics demonstrating an exemplary implementation of an energy management system to control oscillating excursions in a forward-facing, compression-based securement system during a front impact.

FIG. 59 shows the securement system at T0, at the moment of a front-side accident. At about this time, the computing device 110 will ascertain that an adverse driving condition has occurred and will prepare to deploy one or more safety devices. In one embodiment, the computing device 110 may receive data indicating that the vehicle has experienced a large acceleration in the rearward direction, and will conclude that the adverse driving condition is a front-side impact. The computing device 110 will know to trigger one or more of the following safety devices, preferably before T1c, when the wheeled mobility device begins its forward excursion: (1) a safety device that urges the bumpers 350, 360 toward each other to increase the squeezing force on the wheeled mobility device; (2) a safety device that urges or pivots the bumpers 350, 360 downward to push the wheeled mobility device 310 downward against the floor; and/or (3) one or more secondary safety devices, such as the safety device described above that quickly moves the secondary gripping members 355, 365 into its extended position. The computing device will then know to trigger a fast-acting safety device that moves the rear-side bumper 370 after a pre-determined time delay has elapsed, where the pre-determined time delay corresponds to the rebound time for the wheeled mobility device. Although not described for this embodiment, the computing device 110 could be programmed to deploy additional safety devices to control further oscillations.

Figure 60:
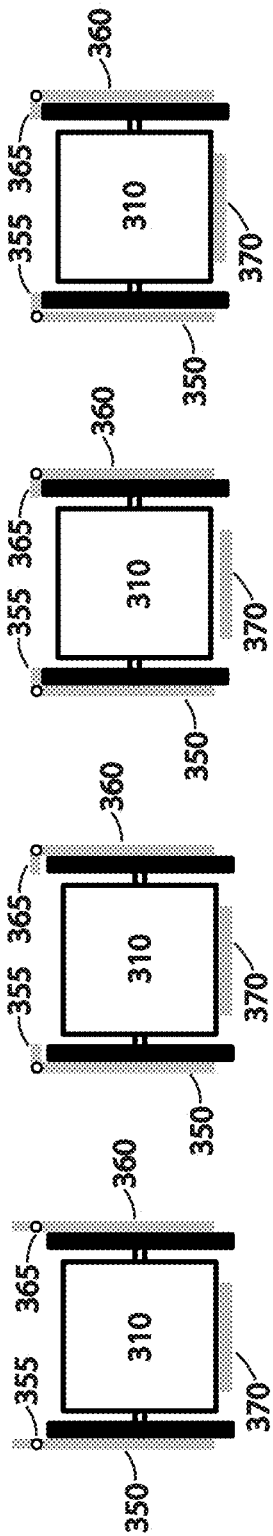

FIG. 60 shows the securement system after the front-side collision, at about T1c, before or approximately when the wheeled mobility device has begun its initial, forward excursion. The secondary gripping members 355, 365 have been deployed, and downward force and additional squeezing force have been applied via bumpers 350, 360.

Figure 61:
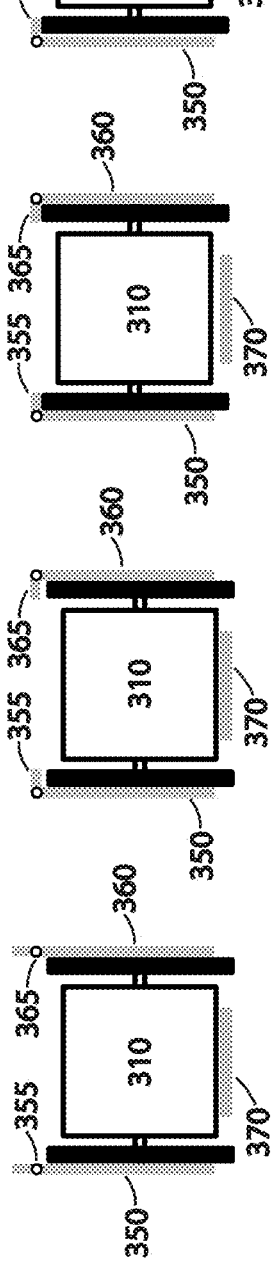

FIG. 61 shows the securement system at about T2c, when the wheeled mobility device has completed its initial, forward excursion (i.e., approximately when the pre-determined time delay has elapsed). As can be seen, at T2c, wheeled mobility device 310 has moved forward a distance, the front surfaces of the wheels are pressed against the secondary gripping members 355, 365, and a gap or space has formed between the rear-side bumper 370 and the wheeled mobility device.

Figure 62:
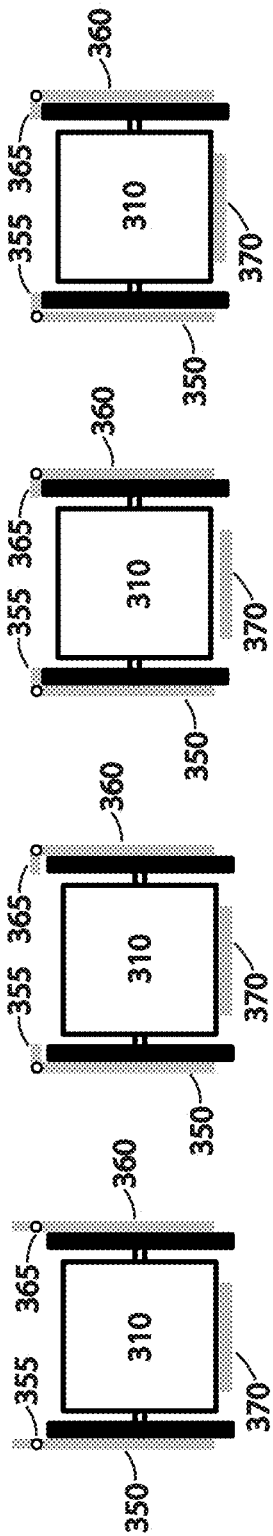

FIG. 62 shows the securement system immediately after the computing device 110 has triggered the safety device for the rear-side bumper 370 (i.e., after the pre-determined time delay has elapsed). It can be seen that a fast-acting device has moved the rear-side bumper 370 forward to close the gap, ideally prior, at or about the time the wheeled mobility device begins its secondary, rearward excursion.

While FIGS. 59-62 demonstrate how an energy management system could be implemented for a wheeled mobility device secured in a forward-facing orientation in a compression-based system while experiencing a front-side collision, the concepts described above may be applied during a heavy braking event. In addition, the concepts describe above may be applied in a rear-side collision or heavy acceleration event. Further yet, the concepts described above may be applied with a rear-facing wheeled mobility device that is experiencing a front-side or rear-side collision, a heavy braking event, or a heavy acceleration event. Even further yet, the concepts described above may be applied with a side-facing wheeled mobility device that is experiencing a right-side or left-side collision, or a long duration or sharp turn. Even further yet, the concepts described above for the moveable bumpers and secondary safety devices may be applied to the use of a bumper in a tie-down system or other type of securement system.

Turning now to FIGS. 63-66, an exemplary implementation of an energy management system is shown to control oscillating excursions in a forward-facing, compression-based securement system during a left-side impact. In addition to the bumpers 350, 360, 370 described for the embodiment of FIGS. 59-72, the securement system may optionally include secondary safety devices, such as those in the form of bumpers 380, 390 that are recessed in the floor and configured to deploy upward and outward to make contact with inner-facing surfaces of the wheeled mobility device, such as the inner surfaces of the wheels.

Figure 63:
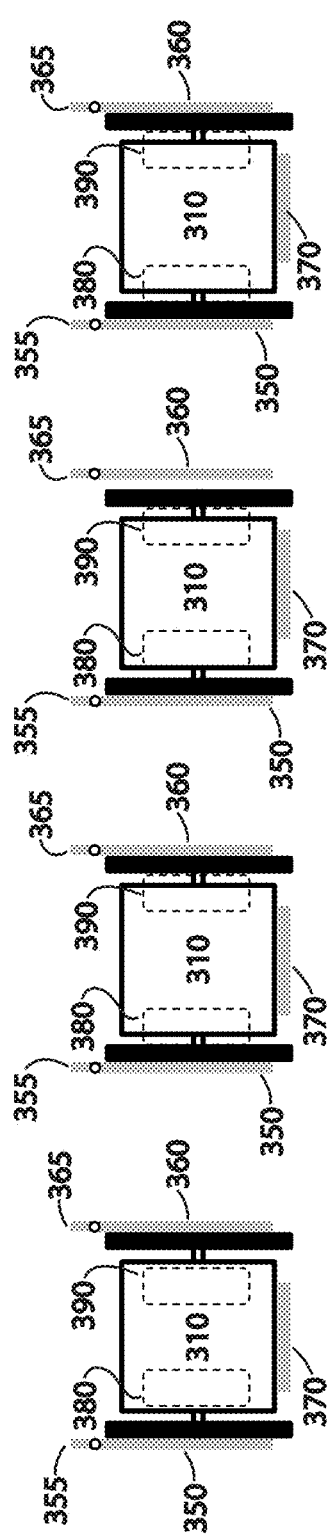
FIGS. 63-66 are a collection of schematics demonstrating an exemplary implementation of an energy management system to control oscillating excursions in a compression-based securement system during a left-side impact.
Figure 64:
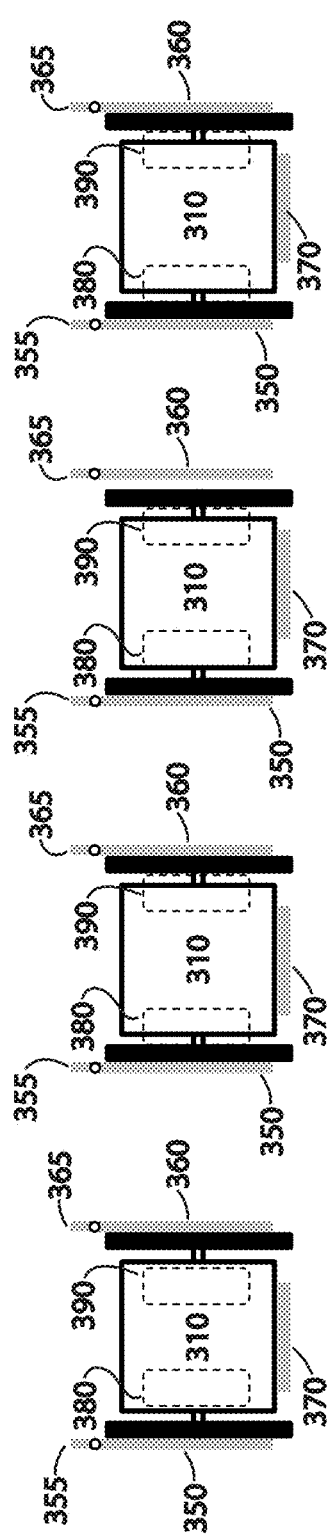

FIG. 63 shows the securement system at T0, at the moment of a left-side accident. At about this time, the computing device 110 will ascertain that an adverse driving condition has occurred and will prepare to deploy one or more safety devices. In one embodiment, the computing device 110 may receive data indicating that the vehicle has experienced a large acceleration in the rightward direction, and will conclude that the adverse driving condition is a left-side impact. The computing device 110 will know to trigger one or more of the following safety devices, preferably before T1c, when the wheeled mobility device begins its forward excursion: (1) a safety device that urges the bumpers 350, 360 toward each other to increase the squeezing force on the wheeled mobility device; (2) a safety device that urges or pivots the bumpers 350, 360 downward to push the wheeled mobility device 310 downward against the floor; and/or (3) one or more secondary safety devices, such as the safety device described above that quickly moves the in-floor bumpers 380, 390 upward and outward into engagement with inward facing surfaces of the wheeled mobility device 310. The computing device will then know to trigger a fast-acting safety device that moves the right-side bumper 360 into contact with the wheeled mobility device 310 after a pre-determined time delay has elapsed, where the pre-determined time delay corresponds to the rebound time for the wheeled mobility device. Although not described for this embodiment, the computing device 110 could be programmed to deploy additional safety devices to control further oscillations, for example quickly moving the left-side bumper 360 into contact with the wheeled mobility device 310 after a secondary rebound.

Figure 65:
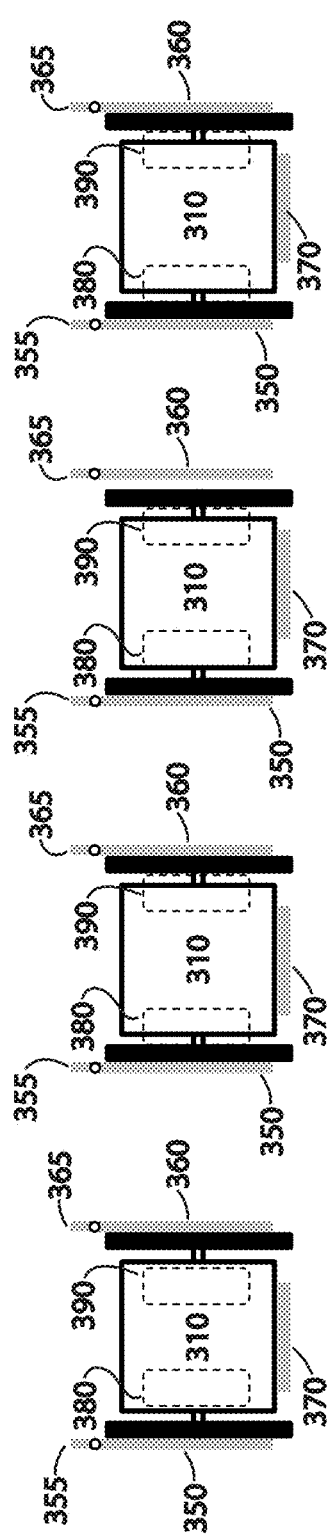

FIG. 65 shows the securement system at about T2c, when the wheeled mobility device has completed its initial, leftward excursion (i.e., approximately when the pre-determined time delay has elapsed). At this point, the wheeled mobility device has moved left a distance and compressed the bumpers 350, 390, and gaps or spaces have formed between the wheeled mobility device and bumpers 360, 380.

Figure 66:
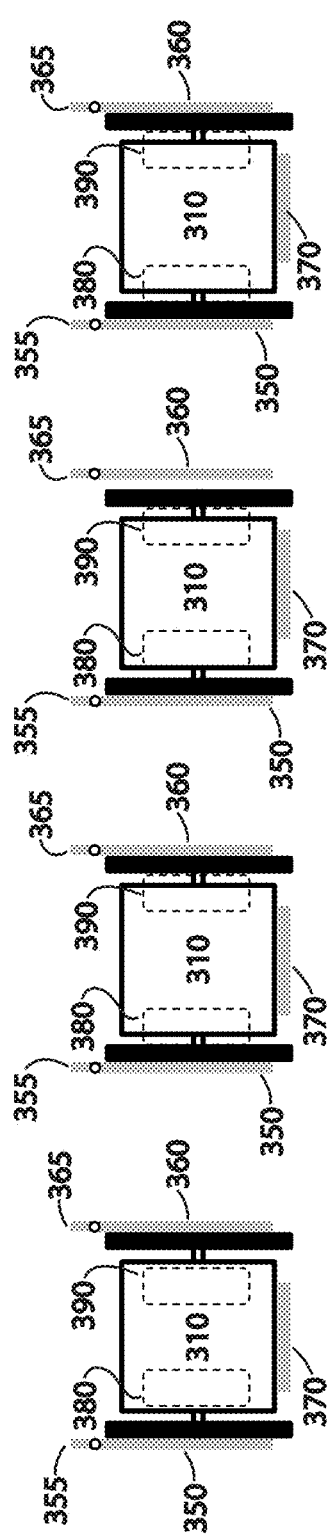

FIG. 66 shows the securement system immediately after the computing device 110 has triggered the safety devices for the bumpers 360, 380 (i.e., after the first pre-determined time delay has elapsed). It can be seen that a fast-acting device has moved the bumpers 360, 380 to the left to close the gaps, ideally prior, at or about the time the wheeled mobility device begins its secondary, rearward excursion.

While FIGS. 63-66 demonstrate how an energy management system could be implemented for a wheeled mobility device secured in a forward-facing orientation in a compression-based system while experiencing a left-side collision, the concepts described above may be applied during a right-side collision, a long duration turn, or a sharp turn event. In addition, the concepts described above may be applied with a side-facing wheeled mobility device that is experiencing a front- or rear-side collision. Even further yet, the concepts described above for the moveable bumpers and secondary safety devices may be applied to the use of a bumper in a tie-down system or other type of securement system.

Turning now to FIGS. 67-71, an exemplary implementation of an energy management system is shown to control excursions in a forward-facing, tie-down securement system during a vehicle roll-over to the right side. For purposes of simplicity, the wheeled mobility device 310 is shown in rear plan view with a left-side tie-down 322 and a right-side tie-down 332, each of which could be representative of either or both of a front restraint and a rear restraint, and a bumper 340, which may or may not be present. Accordingly, the accompanying description below is applicable in any tie-down based system, whether a four-point, three-point, or two-point system, and whether or not a bumper is present.

FIG. 67 shows the tie-down securement system at T0, at the moment of the rollover to the right side. At about this time, the computing device 110 will ascertain that an adverse driving condition has occurred and will prepare to deploy one or more safety devices. In one embodiment, the computing device 110 may receive data indicating that the vehicle has experienced a rotation in the clockwise direction, and will conclude that the adverse driving condition is a rollover to the right side. The computing device 110 will then know to trigger a fast-acting tensioner for the left-side tie-down(s) 322 after a first pre-determined time delay has elapsed, where the first pre-determined time delay corresponds to the rebound time for the wheeled mobility device. The computing device 110 will then know to trigger a fast-acting tensioner for the right-side tie-down 332 and a safety device for moving the bumper 340 into contact with the wheeled mobility device 310 after a second pre-determined time delay has elapsed, where the second pre-determined time delay corresponds to the secondary rebound time for the wheeled mobility device.

More particularly, FIG. 68 shows the tie-down securement system after the rollover to the right side of the vehicle, at about T2c, when the wheeled mobility device 310 has completed its initial excursion in a counterclockwise direction relative to the vehicle (i.e., approximately when the first pre-determined time delay has elapsed). As can be seen, at T2c, wheeled mobility device 310 has rotated counterclockwise and pushed into the bumper 340, the right-side tie-down 332 has stretched, and the left-side tie-down 322 has slack in the webbing. FIG. 69 shows the tie-down securement system immediately after the computing device 110 has triggered the first safety device (i.e., after the first pre-determined time delay has elapsed). It can be seen that a fast-acting tensioner has removed the slack from the webbing in the left-side tie-down(s) 322, ideally prior, at or about the time the wheeled mobility device begins its clockwise excursion. FIG. 70 shows the tie-down securement system at about T3c, when the wheeled mobility device has completed its secondary, clockwise excursion (i.e., approximately when the second pre-determined time delay has elapsed). As can be seen, at T3c, the wheeled mobility device 310 has rotated clockwise relative to the vehicle, although not as far as it otherwise would if the computing device 110 did not trigger safety devices for the left-side tie-down 322. In FIG. 70 (as compared to FIG. 69), the left-side tie-down 322 has stretched, the right-side tie-down 332 may have slack in the webbing, and a space or gap may have formed between the wheeled mobility device and the bumper 340. FIG. 71 shows the tie-down securement system immediately after the computing device 110 has triggered the second safety devices (i.e., after the second pre-determined time delay has elapsed). In FIG. 71, it can be seen that a fast-acting tensioner has removed the slack from the webbing in the right-side tie-down 322 and the bumper 340 has moved to close the gap, ideally prior, at or about the time the wheeled mobility device begins its tertiary, counterclockwise excursion. Additional bumper movement and tensioning events may be necessary or desirable in more severe events to address additional oscillations.

While FIGS. 67-71 demonstrate how an energy management system could be implemented for a wheeled mobility device secured in a forward-facing, tie-down securement system while experiencing a right-side rollover, the concepts described above may be applied during a left-side roll-over, a long duration turn, or a sharp turn event. In addition, the concepts described above may be applied with a rear-facing wheeled mobility device that is experiencing a rollover, or a side-facing wheeled mobility device that is experiencing a front- or rear-side collision. Further yet, the concepts described above may be applicable to control excursions during a right-side or left-side impact for a wheeled mobility device and occupant having a high center of gravity.

Turning now to FIGS. 72-76, an exemplary implementation of an energy management system is shown to control oscillating excursions in a forward-facing, compression-based securement system during a right-side rollover. In addition to the bumpers 350, 360 described for the embodiment of FIGS. 59-72, the securement system may optionally include secondary safety devices, such as those in the form of bumpers 380, 390 that are recessed in the floor and configured to deploy upward and outward to make contact with inner-facing surfaces of the wheeled mobility device, such as the inner surfaces of the wheels.

FIG. 72 shows the securement system at T0, at the moment of a rollover to the right-side. At about this time, the computing device 110 will ascertain that an adverse driving condition has occurred and will prepare to deploy one or more safety devices. In one embodiment, the computing device 110 may receive data indicating that the vehicle has experienced a rotation in the clockwise direction, and will conclude that the adverse driving condition is a rollover to the right side. The computing device 110 may be programmed to trigger one or more of the following safety devices before T1c, when the wheeled mobility device begins its forward excursion: (1) a safety device that urges the bumpers 350, 360 toward each other to increase the squeezing force on the wheeled mobility device; (2) a safety device that urges or pivots the bumpers 350, 360 downward to push the wheeled mobility device 310 downward against the floor; and/or (3) one or more secondary safety devices, such as the safety device described above that quickly moves the in-floor bumpers 380, 390 upward and outward into engagement with inward facing surfaces of the wheeled mobility device 310. Additionally or alternatively (the alternative scenario being shown in FIGS. 72-76), the computing device may be programmed to trigger a fast-acting safety device that moves the right-side bumpers 360, 390 into contact with the wheeled mobility device 310 after a first pre-determined time delay has elapsed, where the first pre-determined time delay corresponds to the rebound time for the wheeled mobility device. The computing device may also be programmed to trigger a fast-acting safety device that moves the left-side bumpers 350, 380 into contact with the wheeled mobility device 310 after a second pre-determined time delay has elapsed, where the second pre-determined time delay corresponds to the secondary rebound time for the wheeled mobility device.

FIG. 73 shows the securement system after the rollover to the right side of the vehicle, at about T2c, when the wheeled mobility device has completed its initial excursion in a counterclockwise direction relative to the vehicle (i.e., approximately when the first pre-determined time delay has elapsed). At this point, the wheeled mobility device has rotated counterclockwise (relative to the vehicle) and pushed into the bumper 350, and a gap or space has formed between the wheeled mobility device and bumper 360.

FIG. 74 shows the securement system immediately after the computing device 110 has triggered the safety devices for the bumpers 360, 390 (i.e., after the first pre-determined time delay has elapsed). It can be seen that a fast-acting device has moved the bumpers 360, 390 toward the wheeled mobility device to close the gap, ideally prior, at or about the time the wheeled mobility device begins its secondary excursion in the clockwise direction. FIG. 75 shows the securement system at about T3c, when the wheeled mobility device has completed its secondary, clockwise excursion (i.e., approximately when the second pre-determined time delay has elapsed). As can be seen, at T3c, the wheeled mobility device 310 has rotated clockwise relative to the vehicle, although not as far as it otherwise would if the computing device 110 did not trigger safety devices for the bumpers 360, 290. In FIG. 75 (as compared to FIG. 74), the wheeled mobility device has pushed into both bumpers 360, 390, and a gap or space may have formed between bumper 350 and the wheeled mobility device 310. FIG. 76 shows the securement system immediately after the computing device 110 has triggered the second safety devices (i.e., after the second pre-determined time delay has elapsed). In FIG. 76, it can be seen that a fast-acting safety device has moved bumpers 350, 380 toward the wheeled mobility device to close the gap, ideally prior, at or about the time the wheeled mobility device begins its tertiary, counterclockwise excursion. Additional bumper movement events may be necessary or desirable in more severe events to address additional oscillations.

While FIGS. 72-76 demonstrate how an energy management system could be implemented for a wheeled mobility device secured in a forward-facing, compression-based securement system while experiencing a right-side rollover, the concepts described above may be applied during a left-side roll-over, a long duration turn, or a sharp turn event. In addition, the concepts described above may be applied with a rear-facing wheeled mobility device that is experiencing a rollover, or a side-facing wheeled mobility device that is experiencing a front- or rear-side collision. Further yet, the concepts described above may be applicable to control excursions during a right-side or left-side impact for a wheeled mobility device and occupant having a high center of gravity.

Even further, FIGS. 4-76, for purposes of simplicity, were described as having a computing device that was programmed to assume how the various belts and/or bumpers would react in an accident, and to trigger safety devices based on that assumption. In more advanced systems, the computing device can monitor the dynamic characteristics of the vehicle and/or the wheeled mobility device and/or the securement system and to trigger safety devices based on the actual response of the system. In other systems, the computing device can monitor the status of the securement system through various sensors, such as tension sensors for tie downs and pressure or proximity sensors for bumpers. Based on input from those sensors, the computing device will be able to detect where slack or gaps are forming (e.g., based on sensing a fast reduction in tension or pressure, a proximity sensor or switch, etc.) and to trigger one or more safety devices to remove such slack or gaps at the appropriate time.

During some adverse driving conditions, it may be desirable to (additionally or alternatively) trigger safety devices in a manner designed to keep the wheeled mobility device stationary, or at least minimize movement. For example, in the forward-facing four-point tie-down system shown in FIG. 4, in a heavy braking event or other scenario whether the vehicle experiences a rearward acceleration, it may be preferable to trigger tensioning devices for the rear-side tie-downs 330, 335 to prevent or minimize forward movement of the wheeled mobility device, preferably at the same time or shortly after the computing system detects a rearward acceleration. The amount of tension applied can be selected or adjusted over time based on the magnitude of the acceleration experienced by the vehicle. Tightening the rear-side tie-downs 330, 335 may prevent or minimize the slack created in the front-side tie-downs 320, 325. At or about the time of the anticipated or actual rebound, the tension on the rear-side tie-downs 330, 335 can be released and/or tensioning devices for the front-side tie-downs 320, 325 can be triggered. A similar procedure can be followed for subsequent oscillations, and for scenarios where the vehicle experiences a forward acceleration.

Similarly, in the forward-facing four-point tie-down system shown in FIG. 9, in a sharp right turning event or other scenario whether the vehicle experiences a rightward acceleration, it may be preferable to trigger tensioning devices for the right-front-side tie-down 325 and left-rear-side tie-down 330 to prevent or minimize leftward movement of the wheeled mobility device, preferably at the same time or shortly after the computing system detects a rightward acceleration. The amount of tension applied can be selected or adjusted over time based on the magnitude of the acceleration experienced by the vehicle. Tightening the right-front-side tie-down 325 and left-rear-side tie-down 330 may prevent or minimize the slack created in the left-front-side tie-down 320 and right-rear-side tie-down 335. At or about the time of the anticipated or actual rebound, the tension on the right-front-side tie-down 325 and left-rear-side tie-down 330 can be released and/or tensioning devices for the left-front-side tie-down 320 and right-rear-side tie-down 335 can be triggered. A similar procedure can be followed for subsequent oscillations, and for scenarios where the vehicle experiences a leftward acceleration.

Similarly, in the forward-facing three-point tie-down system shown in FIG. 24, in a sharp right turning event or other scenario whether the vehicle experiences a rightward acceleration, it may be preferable to trigger a tensioning device for the left-rear-side tie-down 330 and a safety device to move the bumper 340 into contact with the wheeled mobility device to prevent or minimize leftward movement of the wheeled mobility device, preferably at the same time or shortly after the computing system detects a rightward acceleration. The amount of tension applied by the tie-down and/or pressure applied by the bumper can be selected or adjusted over time based on the magnitude of the acceleration experienced by the vehicle. Tightening the left-rear-side tie-down 330 and moving the bumper 340 into contact with the wheeled mobility device may prevent or minimize the slack created in the left-front-side tie-down 320 and right-rear-side tie-down 335. At or about the time of the anticipated or actual rebound, the tension on the left-rear-side tie-down 330 and the pressure exerted by the bumper 340 can be released and/or tensioning devices for the left-front-side tie-down 320 and right-rear-side tie-down 335 can be triggered. A similar procedure can be followed for subsequent oscillations, and for scenarios where the vehicle experiences a leftward acceleration.

Similarly, in the forward-facing compression-based securement system shown in FIG. 59, in a heavy acceleration event or other scenario whether the vehicle experiences a forward acceleration, it may be preferable to trigger safety devices to apply additional squeezing force on the wheeled mobility device 310 with the bumpers 350, 360, and forward force on the wheeled mobility device 310 with bumper 370 to prevent or minimize rearward movement of the wheeled mobility device, preferably at the same time or shortly after the computing system detects a forward acceleration of the vehicle. The amount of pressure applied by the bumper can be selected or adjusted over time based on the magnitude of the acceleration experienced by the vehicle. These actions may prevent or minimize the gap or space created between the wheeled mobility device 310 and the bumper 370. At or about the time of the anticipated or actual rebound, the pressure exerted by the bumper 370 can be released. A similar procedure can be followed for subsequent oscillations, and for scenarios where the vehicle experiences a rearward acceleration.

Similarly, in the forward-facing compression-based securement system shown in FIG. 63, in a sharp right turning event or other scenario whether the vehicle experiences a rightward acceleration, it may be preferable to trigger a safety device to move the bumpers 350 and/or 390 into contact with the wheeled mobility device to prevent or minimize leftward movement of the wheeled mobility device, preferably at the same time or shortly after the computing system detects a rightward acceleration. The amount of pressure applied by the bumpers can be selected or adjusted over time based on the magnitude of the acceleration experienced by the vehicle. Moving the bumpers 350 and/or 390 into contact with the wheeled mobility device may prevent or minimize the gap or space created between the wheeled mobility device 310 and the bumper 360. At or about the time of the anticipated or actual rebound, the pressure exerted by the bumper 350 and/or 390 can be released and/or safety devices for the bumpers 360 and/or 380 can be triggered to move them into contact with the wheeled mobility device 310. A similar procedure can be followed for subsequent oscillations, and for scenarios where the vehicle experiences a leftward acceleration.

Similarly, in the forward-facing four-point tie-down system shown in FIG. 67, in a sharp right turning event or other scenario whether the vehicle experiences a rightward acceleration or clockwise rotation, it may be preferable to trigger (a) a tensioning device for the right-side tie-down 332 and/or (b) a safety device for the bumper 340 to move it into contact with the wheeled mobility device 310, to prevent or minimize tipping (counterclockwise rotation) of the wheeled mobility device, preferably at the same time or shortly after the computing system detects a rightward acceleration or clockwise rotation of the vehicle. The amount of tension applied by the tie-down and/or pressure applied by the bumper can be selected or adjusted over time based on the magnitude of the acceleration experienced by the vehicle. Tightening the right-side tie-down 332 and/or moving the bumper 340 may prevent or minimize the slack created in the left-side tie-down 322. At or about the time of the anticipated or actual rebound, the tension on the right-side tie-down 332 and the pressure applied by the bumper 340 can be released and/or a tensioning device for the left-side tie-down 322 can be triggered. A similar procedure can be followed for subsequent oscillations, and for scenarios where the vehicle experiences a leftward acceleration or counterclockwise rotation.

Similarly, in the forward-facing compression-based system shown in FIG. 72, in a sharp right turning event or other scenario whether the vehicle experiences a rightward acceleration or clockwise rotation, it may be preferable to trigger (a) a safety device for bumper 350 to apply inward pressure to the wheeled mobility device 310 and/or (b) a safety device for bumper 360 to apply downward pressure to the wheeled mobility device 310 and/or (c) a safety device for bumper 390 to move bumper 390 into contact with the wheeled mobility device 310, preferably at the same time or shortly after the computing system detects a rightward acceleration or clockwise rotation of the vehicle. The amount of pressure applied by the bumpers can be selected or adjusted over time based on the magnitude of the acceleration experienced by the vehicle. Taking such action may prevent or minimize the gap or space created between the wheeled mobility device and the bumper 360. At or about the time of the anticipated or actual rebound, the pressure applied by the bumpers 350 and/or 360 and/or 390 can be released and/or the computing device can trigger (a) a safety device for bumper 360 to apply inward pressure to the wheeled mobility device 310 and/or (b) a safety device for bumper 350 to apply downward pressure to the wheeled mobility device 310 and/or (c) a safety device for bumper 380 to move bumper 380 into contact with the wheeled mobility device 310. A similar procedure can be followed for subsequent oscillations, and for scenarios where the vehicle experiences a leftward acceleration or counterclockwise rotation.

During some adverse driving conditions, it may be desirable to (additionally or alternatively) trigger safety devices in a manner designed to prevent crushing of the passenger between the wheeled mobility device and the occupant safety belt, or at least minimize crushing. By monitoring the dynamic condition of the wheeled mobility device and the passenger, using one or more of the methods described above, the computing device can trigger safety devices that (a) create or close a gap between the wheeled mobility device; (b) reduce or increase the pressure exerted by the wheeled mobility device on the passenger; and/or (c) reduce or increase the pressure exerted by the occupant belts on the passenger.

In one embodiment, the computing device can trigger safety devices designed to minimize the change in distance between the wheeled mobility device 10 and the passenger 5. For example, with reference to FIG. 1, the computing device can trigger a tensioning device for the rear tie-downs 20 before, at, or about T1$c$ to delay or slow the forward excursion to prevent a gap between the wheeled mobility device 10 and passenger 5 from closing. The amount of tension applied can be selected or adjusted over time based on the gap between the wheeled mobility device or the rate of change in the gap. Additionally or alternatively, before, at, or about T1$p$, the computing device can trigger a safety device for the occupant restraint retractors to allow some webbing to slowly release over time, thereby allowing the passenger to move at or about the same pace as the wheeled mobility device. The rate of release can be selected or adjusted over time based on the gap between the wheeled mobility device or the rate of change in the gap. Additionally or alternatively, before, at, or about T2$c$, the computing device can trigger a tensioning device for the front tie-downs 30 to cause the wheeled mobility device 10 ($a$) to continue its forward excursion, thereby allowing the wheeled mobility device to continue its forward excursion at or about the same pace as the passenger, and/or ($b$) to delay or slow the rearward excursion of the wheeled mobility device to prevent a gap between the wheeled mobility device 10 and passenger 5 from increasing. The amount of tension applied can be selected or adjusted over time based on the gap between the wheeled mobility device or the rate of change in the gap. Additionally or alternatively, before, at, or about T3$c$, the computing device can trigger a tensioning device for the rear tie-downs 20 to cause the wheeled mobility device 10 ($a$) to continue its rearward excursion, thereby allowing the wheeled mobility device to continue its forward excursion at or about the same pace as the passenger, and/or ($b$) to delay or slow the forward excursion of the wheeled mobility device to prevent a gap between the wheeled mobility device 10 and passenger 5 from closing. The amount of tension applied can be selected or adjusted over time based on the gap between the wheeled mobility device or the rate of change in the gap.

In other embodiments, the computing device can track the anticipated or actual position of the wheeled mobility device and the passenger, and make continuous adjustments during the entire adverse driving scenario to: (a) keep the space between the two relatively constant, (b) keep the space between the two above a lower threshold, or between an upper and lower threshold, (c) keep the force exerted on the passenger by one or both of the wheeled mobility device and occupant restraints below a threshold, or between upper and lower thresholds, and/or (d) keep the squeezing force below a threshold or between an upper and lower threshold. In one embodiment, the computing device will monitor the force being exerted on the passenger 5 by the occupant restraints, and cause a slow release of webbing from the occupant restraint retractors when the force exceeds a certain threshold. The rate of release can be increased if the force continues to increase above a second threshold, in proportion to the rate of increase in force, or based on the rate of increase in force. In another embodiment, the computing device will monitor the squeezing force being exerted on the passenger 5 by the wheeled mobility device 10 and the occupant restraints, and if the squeezing force exceeds a certain threshold, trigger safety devices that allow webbing to be released from the occupant restraint retractors and/or slow the forward excursion of the wheeled mobility device and/or allow or cause the wheeled mobility device to accelerate rearward.

During some adverse driving conditions, it may be desirable to (additionally or alternatively) trigger airbag devices to control excursions of the passenger and/or the wheeled mobility device. For example, in one embodiment shown in FIG. 94, one or more airbags 401, 402, 403, 404 can placed on one or more, or each, of the front-side, rear-side, left-side, and right-side of the wheeled mobility device 410, and can be used to control excursions of the wheeled mobility device 410. In a front-side impact, the front-side airbag 401 can be triggered to control the forward excursion of the wheeled mobility device 410. At or shortly after the initial, rearward rebound, the rear-side airbag 402 can be triggered to control the rearward excursion. Additional airbags could be triggered to control subsequent rebounds and oscillations. The opposite would occur in a rear-side impact. In a left-side impact, the left-side airbag 403 can be triggered to control the leftward excursion of the wheeled mobility device 410. At or shortly after the initial, leftward rebound, the right-side airbag 404 can be triggered to control the rightward excursion. Additional airbags could be triggered to control subsequent rebounds and oscillations. The opposite would occur in a right-side impact.

Figure 95:
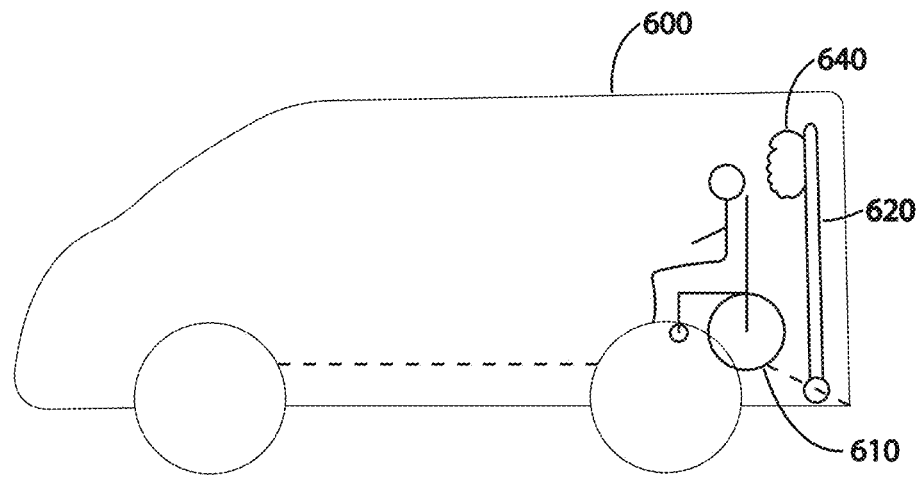
Figure 96:
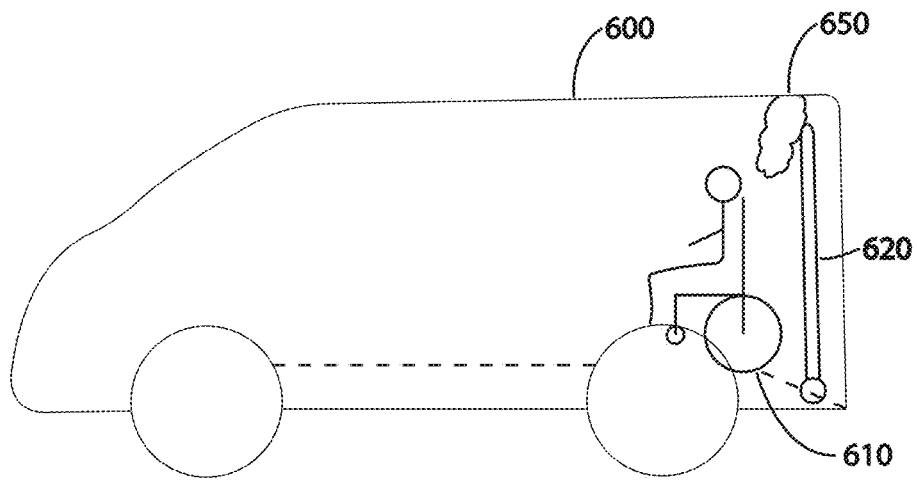
Figure 97:
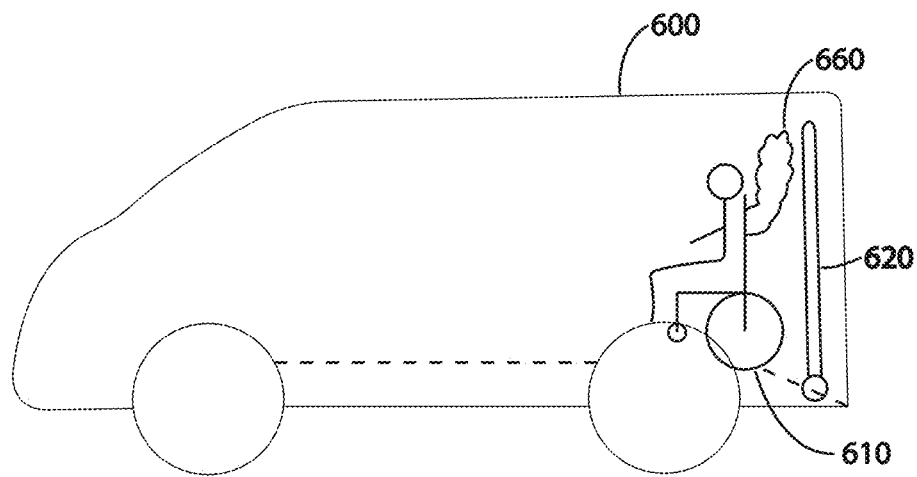

In certain vehicles, including wheelchair-accessible, rear-entry minivans 600 shown in FIGS. 95-97 that have rear-entry ramps 620 that are stored behind the passenger's 630 head during transit of the wheeled mobility device 610, it is desirable to strategically place airbags 640, 650, 660 to control rearward excursion of the passenger's head. In one embodiment, the airbag 640 deploys from the ramp 620. In another embodiment, the airbag 650 deploys from a surface or structure of the vehicle 600, such as the ceiling, wall, or pillar. In other embodiments, the airbag 660 may be integrated into and deploy from the wheeled mobility device 610. In a front-side impact, the airbags 640, 650, 660 can be triggered at, about, or after the passenger begins its rebound in the rear direction. In a rear-side impact, the airbags 640, 650, 660 can be triggered when the accident is detected, or at, about, or after the passenger begins its rearward excursion. In some embodiments, the computing system can monitor the dynamic status of the passenger and deploy the airbags 640, 650, 660 when rearward movement of the passenger or the passenger's head is detected. The airbag can be large, and/or control rearward excursion of one or more of the passenger's head, passenger's back, the seat back of the wheeled mobility device, and the wheeled mobility device.

Although the inventions described and claimed herein have been described in considerable detail with reference to certain embodiments, one skilled in the art will appreciate that the inventions described and claimed herein can be practiced by other than those embodiments, which have been presented for purposes of illustration and not of limitation. Therefore, the spirit and scope of the appended claims should not be limited to the description of the embodiments contained herein.

For instance, although only some types of wheeled mobility device securement systems are shown in the Figures and described above, it is contemplated that the principles described above can be modified for use in any wheeled mobility device securement system, and any configuration (forward-facing, rearward facing, etc.). Moreover, although only some adverse driving scenarios are shown and described above, it is contemplated that the principles described above can be modified to be appropriate for other adverse driving scenarios. Even further, it is contemplated that the principles described above can be used for securement of other types of mobility devices, including walkers, strollers, buggies, infant and toddler car seat and boosters, etc.

For the avoidance of doubt, the terms wheeled mobility device and wheelchair are used interchangeably herein and are intended to broadly encompass all types of wheeled mobility devices including manual and powered wheelchairs and scooters. Moreover, while the present application often refers to tie-downs comprising webbing, it is recognized that tie-downs can take many forms, including for example cords and cables, and the principles described herein are applicable to securement systems using any form of tie-down.

In addition, the concepts described above may be applied in mirror image securement systems. For example, the three point system shown in FIGS. 19-28 may have a right-front-side tie down, rather than the left-front-side tie down 320, and may also have the bumper 340 located on the right side, rather than the left. Moreover, any securement system may incorporate one or more bumpers located on any one or more of the four sides of the wheeled mobility device, which may be controlled to reduce excursions in the manners described herein.

The invention claimed is:

1. A wheelchair accessible vehicle for transporting a wheelchair occupant while seated in a wheelchair, the wheelchair accessible vehicle comprising:
a securement system for releasably securing at least one of the wheelchair occupant and the wheelchair; and,
at least one processor and at least one storage medium, the at least one storage medium having instructions stored therein, which when executed by the at least one processor causes the at least one processor to perform operations comprising: triggering a safety device for at least one of the wheelchair occupant and the wheelchair during an adverse driving event and storing data indicative of at least one characteristic of at least one of the securement system, the wheelchair occupant, and the wheelchair during the adverse driving event on the at least one storage medium, wherein the data includes information associated with the triggering of the safety device.

2. The wheelchair accessible vehicle of claim 1, wherein the data includes dynamic information concerning the wheelchair accessible vehicle.

3. The wheelchair accessible vehicle of claim 1 further comprising at least one sensor generating a signal indicative of the at least one characteristic of one of the securement system, the wheelchair occupant, and the wheelchair.

4. The wheelchair accessible vehicle of claim 3, wherein the operations performed by the at least one processor further comprises monitoring the data to identify the adverse driving condition.

5. The wheelchair accessible vehicle of claim 3, wherein the sensor comprises a camera in a video-based analytic system that monitors the wheelchair occupant and wheelchair in the wheelchair securement system.

6. The wheelchair accessible vehicle of claim 1, wherein the at least one characteristic includes a status of the wheelchair securement system.

7. The wheelchair accessible vehicle of claim 6, wherein the status is whether the wheelchair is engaged by the wheelchair securement system.

8. The wheelchair accessible vehicle of claim 6, wherein the wheelchair securement system comprises a plurality of tie-downs and the status is the number of tie-downs utilized to secure the wheelchair.

9. The wheelchair accessible vehicle of claim 6, wherein the status is a position of the wheelchair securement system.

10. The wheelchair accessible vehicle of claim 9, wherein the position is an angle of a wheelchair tie-down.

11. The wheelchair accessible vehicle of claim 9, wherein the position is a location of a wheelchair engagement member.

12. The wheelchair accessible vehicle of claim 6, wherein the status is a force applied to the wheelchair by the wheelchair securement system.

13. The wheelchair accessible vehicle of claim 12, wherein the force is a tension in a wheelchair tie-down.

14. The wheelchair accessible vehicle of claim 12, wherein the force is a compressive force applied to the wheelchair by a plurality of wheelchair engagement members.

15. The wheelchair accessible vehicle of claim 1, wherein the at least one characteristic includes a status of at least one of the wheelchair and the wheelchair occupant.

16. The wheelchair accessible vehicle of claim 15, wherein the status is a location of at least one of the wheelchair and the wheelchair occupant in the wheelchair accessible vehicle.

17. The wheelchair accessible vehicle of claim 15, wherein the status is an orientation of at least one of the wheelchair and the wheelchair occupant.

18. The wheelchair accessible vehicle of claim 15, wherein the status is at least one of a direction of movement, a velocity, and an acceleration of at least one of the wheelchair and the wheelchair occupant.

19. The wheelchair accessible vehicle of claim 1, wherein the at least one characteristic is an identity of at least one of the wheelchair occupant and the wheelchair.

20. A computer implemented method comprising:
identifying data indicative of at least one characteristic of at least one of a wheelchair occupant, a wheelchair, and a securement system securing the wheelchair in a wheelchair accessible vehicle during an adverse driving event;
triggering a safety device for at least one of the wheelchair occupant and the wheelchair during the adverse driving event and,
storing the data on a storage medium, wherein the data includes information associated with the triggering of the safety device.

21. A storage medium for wheelchair accessible vehicle configured with a securement system to transport a wheelchair occupant while seated in a wheelchair, the storage medium comprising instructions stored therein, which when executed by at least one processor causes the at least one processor to perform operations comprising: triggering a safety device for at least one of the wheelchair occupant and the wheelchair during the adverse driving event; and, storing data indicative of at least one characteristic of at least one of the securement system, the wheelchair occupant, and the wheelchair during an adverse driving event on the storage medium, wherein the data includes information associated with the triggering of the safety device.

* * * * *